US012347413B1

(12) United States Patent
Yen et al.

(10) Patent No.: US 12,347,413 B1
(45) Date of Patent: Jul. 1, 2025

(54) MITIGATING EFFECTS OF WIND IN AUDIO DATA

(71) Applicant: Amazon Technologies, Inc., Seattle, WA (US)

(72) Inventors: Kuan-Chieh Yen, Foster City, CA (US); Kunal Atitkar, Santa Clara, CA (US); Madhuri Saraf, Sunnyvale, CA (US); Zhouhui Miao, Saratoga, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 17/362,494

(22) Filed: Jun. 29, 2021

(51) Int. Cl.
*G10K 11/178* (2006.01)

(52) U.S. Cl.
CPC .... *G10K 11/17823* (2018.01); *G10K 11/1783* (2018.01); *G10K 11/17854* (2018.01); *G10K 11/17881* (2018.01); *G10K 2210/1081* (2013.01)

(58) Field of Classification Search
CPC ....... G10K 2210/1081; G10K 11/1783; H04R 2460/01; H04R 1/1083
See application file for complete search history.

(56) References Cited

U.S. PATENT DOCUMENTS 5,568,559 A 10/1996 Makino
10,714,073 B1 * 7/2020 Rui .................. G10K 11/17823
10,721,562 B1 * 7/2020 Rui ........................ H04R 1/406
2012/0123771 A1 5/2012 Chen et al.
2013/0308784 A1 11/2013 Dickins
2015/0055788 A1 2/2015 Zakis
2015/0213811 A1 7/2015 Elko et al.
2017/0208407 A1 7/2017 Sapozhnykov
2022/0201416 A1 * 6/2022 Young .................... H04R 1/406
2023/0141100 A1 * 5/2023 Farver .................. H04R 1/1083 381/71.6
2023/0169948 A1 * 6/2023 Yamabe ........... G10K 11/17825 381/71.6

(Continued)

OTHER PUBLICATIONS

"Sony Electronics Unveils the WF-1000XM4 Truly Wireless Headphones, Setting a New Standard for Noise Cancellation", Sony Electronics, Jun. 8, 2021, retrived at <<https://www.sony.com/content/sony/en/en_us/SCA/company-news/press-releases/sony-electronics/2021/sony-electronics-unveils-the-wf1000xm4-truly-wireless-headphones-setting-a-new-standard-for-noise-cancellation.html>>, 7 pages.

(Continued)

*Primary Examiner* — Ping Lee
(74) *Attorney, Agent, or Firm* — Eversheds Sutherland (US) LLP

(57) ABSTRACT

This disclosure describes, in part, techniques to process audio signals to lessen the impact that wind and/or other environmental noise has upon the resulting quality of audio signals output on speaker(s) of wireless earbuds or other headphones. For example, the techniques may determine a level of wind and/or other noise in an environment and may determine how best to process the signals to lessen the impact of the noise, such that one or more users that hear audio based on output of the signals hear higher-quality audio. In some instances, the techniques are able to detect levels of wind in a relatively low-power manner and as part of regular operation of the wireless earbuds or other headphones.

20 Claims, 13 Drawing Sheets

(56) References Cited

U.S. PATENT DOCUMENTS

2024/0057049 A1* 2/2024 Gao .................. H04W 72/0446

OTHER PUBLICATIONS

Office Action for U.S. Appl. No. 17/362,418, mailed on Mar. 28, 2023, Inventor #1 Kuan-Chieh Yen, "Detecting Wind Events in Audio Data," 18 pages.
Office Action for U.S. Appl. No. 17/362,418, mailed on Dec. 15, 2022, Kuan-Chieh Yen, "Detecting Wind Events in Audio Data", 19 pages.
Office Action for U.S. Appl. No. 17/362,418, mailed Jun. 24, 2022, Yen, "Detecting Wind Events in Audio Data ", 18 pages.

* cited by examiner

1300

MITIGATING EFFECTS OF WIND IN AUDIO DATA

BACKGROUND

The use of computing devices in everyday life continues to proliferate. As the use of computing devices increases, so does the use of peripheral devices for interacting with these computing devices. For instance, users are increasingly using headphones to consume audio content, engage in communication sessions with users utilizing other computing devices, and so forth. In some instances, an example first user may use wireless headphones, or "wireless earbuds", that include microphone(s) and speaker(s), and that couple with a mobile phone or other device of the first user, to engage in a communication session with a computing device of a second user, to listen to music, or the like.

Although use of these earbuds may prove convenient for consuming content or engaging in these types of communication sessions, environmental noise, such as wind, may affect the quality of the audio signal generated at an earbud of a user. Thus, alleviating the effect of wind and other environmental noise on the quality of the generated audio signal may enhance the experience of the user.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
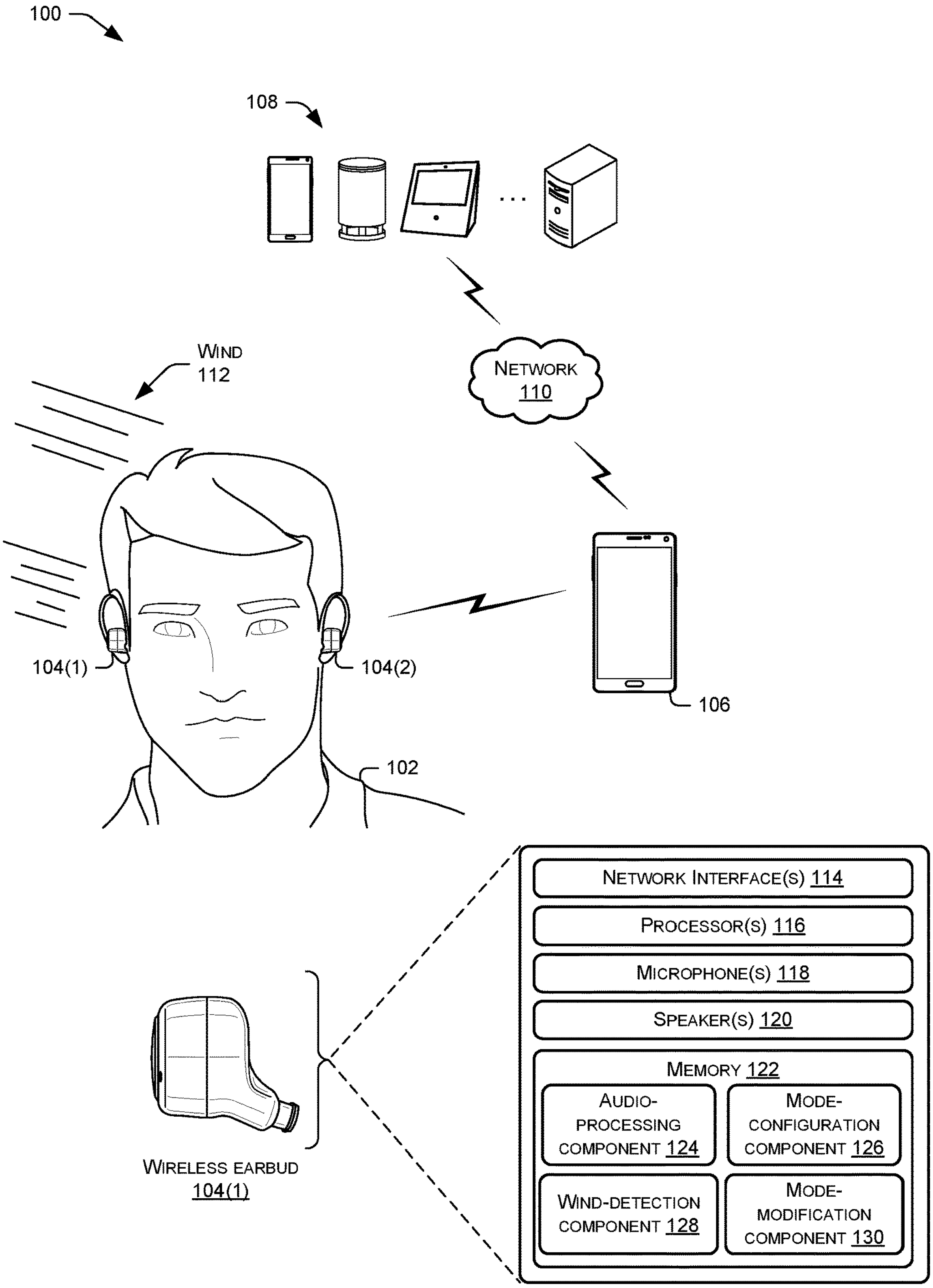
FIG. 1 illustrates a schematic diagram of an illustrative environment in which a user wears wireless earbuds that include speaker(s) for outputting audio content, as well as one or more microphones for generating audio data. In some instances, the earbuds may be configured to operate in a predefined mode, such as an active-noise-control (ANC) mode in which environmental noise is "canceled" from the output audio signal sent to speaker(s) of the earbuds residing in ear canal(s) of the user. However, this figure further illustrates the user may reside in a windy environment, which may affect the quality of the ANC or other mode currently executing on the earbuds. Thus, the wireless earbuds may include functionality for detecting the presence of wind and, if detected, modifying parameters associated with an audio mode of the earbuds to alleviate the effect of the wind and generally increase the quality of user experience.

This disclosure describes, in part, techniques to process audio signals to lessen the impact that wind and/or other environmental noise has upon the resulting quality of audio signals output on speaker(s) of electronic devices, such as wireless earbuds or other wired and/or wireless headphones. For example, the techniques may determine a level of wind and/or other noise in an environment and may determine how best to process the signals to lessen the impact of the noise, such that one or more users that hear audio based on output of the signals hear higher-quality audio. In some instances, the techniques are able to detect levels of wind in a relatively low-power manner and as part of regular operation of electronic device, such as the wireless earbuds or other headphones.

In one example, one or more headphones (e.g., wired earbuds, wireless earbuds, over-the-ear headphones, etc.) may implement the techniques described herein. For example, these techniques may be implemented by one or more wireless earbuds of a pair of wireless earbuds. In this example, each wireless earbud may include one or more speakers for outputting audio into an ear of a user, as well as one or more microphones for generating audio signals based on captured sound, such as speech of the user. In some instances, each wireless earbud may include at least a first microphone oriented in a first direction and a second microphone oriented in a second direction. In some instances, the first microphone may comprise two "outer" microphones each directed towards the environment of the user and substantially towards a mouth of the user (when residing within an ear of the user). The wireless earbud may also include a third microphone that may, in some instances, comprise an "inner" microphone residing within and directed substantially towards an ear canal of the user. Thus, the first and second microphones may be subjected to environmental noise, such as wind, while the third microphone may be substantially protected from this noise. Furthermore, a second wireless earbud, residing in the opposite ear of the user may similarly comprise two outer microphones and at least one inner microphone.

To begin, the techniques may attempt to determine a level of wind or other environment noise present near the user so as to alleviate the impact of this noise upon operation of the wireless earbuds, such as to alleviate the impact of this noise on output audio signals sent to in-ear speakers of the earbuds. To provide an example, the wireless earbuds may be configured to operate in different modes, such as an active-noise-control (ANC) mode, a passthrough mode, a sidetone mode, and/or the like. It is to be appreciated that while several example modes are described herein, the wireless earbuds (and other headphones) may operate in other suitable modes. It is also to be appreciated that while the wind-detection and mitigation techniques are described with reference to the example wireless earbuds, these techniques may apply equally to other electronic devices, such as any electronic device having at least two outer microphones exposed to the ambient environment of the device. Further, the wind-detection techniques may be more effective in electronic devices where the outer microphones are spaced close to one another (e.g., relative to a size of a housing of the device).

At a high level, the ANC mode may function to reduce the amount of environmental noise heard by a user wearing the wireless earbuds. For instance, when a user activates ANC mode on their wireless earbuds, the wireless earbuds may generate, using one or more of the outer microphones of the earbuds, audio data representative of the environmental noise. The earbuds may then use this audio data to "cancel out" the environmental noise experienced by the user. For instance, the earbuds may use the audio data to generate sound that is out of phase with the environmental noise and may inject this sound into a reference signal that is to be played out by speaker(s) of the wireless earbuds. Thus, the out-of-phase audio data effectively "cancels" the environmental noise from the audio signal output by the speaker(s).

However, the variable and incoherent properties of wind may make effective ANC operations difficult. For instance, given that sound waves associated with wind may strike a first outer microphone of a wireless earbud quite differently than a second outer microphone, first audio data generated by the first outer microphone may differ greatly from second audio data generated by the second outer microphone. That is, the first and second audio data may have a relatively low level of coherence to one another. Thus, attempting to cancel out the sound of wind from audio output to a user may be difficult. For this and potentially other reasons, it may be beneficial to attenuate a gain associated with ANC mode when operating in windy conditions, or even to disable the ANC mode when a user is wearing the earbuds in such windy conditions. In some examples discussed below, for instance, the wireless earbuds may detect a level of wind that is greater than a threshold (e.g., based on both magnitude and length of time) and, in response, may attenuate operation of the ANC mode at a predefined rate before disabling the ANC mode. Upon detecting that the wind event has cleared (e.g., that the wind has sufficiently stopped or settled), the wireless earbuds may re-enable the ANC mode and increase the gain of the ANC mode at a predefined rate back to the original settings (or to some other settings).

Passthrough mode, meanwhile, attempts to replicate environmental noises surrounding a user in an audio signal output by speaker(s) of the wireless earbuds so that the user can essentially "hear" what is happening in their ambient environment. For instance, the wireless earbuds may use one or more of the outer microphones to generate audio data representative of the environmental noise and may add sound corresponding to the noise to an audio signal to be output by the speakers, such that a user will hear sound similar to what they would hear if they were not wearing the earbuds. In short, this mode enables the environmental noise to "passthrough" the earbud into the ear of the user.

Again, however, performance of the passthrough mode may be less than ideal when operating in windy conditions. Given that sounds waves associated with wind physical strike the outer microphones, and strike them differently as discussed above, outputting audio data based on this wind and adding this audio data for output into an ear canal of a user may result in a poor user experience. Thus, the techniques described below may modify operation of passthrough mode when passthrough mode is being operated in windy conditions. For instance, in response to detecting a sufficient level of wind, the wireless earbuds may attenuate (and/or disable) the passthrough mode. In some instances, the wireless earbuds may attenuate a gain associated with the passthrough mode such that the user is still able to "hear" some of the environmental noise, while lessening the impact of the relatively strong wind on the output audio data. Further, upon detecting that the wind event has cleared (e.g., that the environment no longer includes significant wind), the techniques may increase the gain associated with the passthrough mode at a predefined rate until it reaches the original settings (or otherwise). It is to be appreciated that the modification of the passthrough mode, as well as the modification of other modes described throughout, may occur automatically in response to detecting a wind event and without user intervention or request to make the modification.

Sidetone mode, meanwhile, may operate on the wireless headphones when a user is engaging in a communication session (e.g., phone call, video call, etc.) with another user and/or another user device. For instance, sidetone mode may operate by using the outer microphones of the earbuds to generate audio data indicative of the user speaking during the communication session and may generate audio data representative of this user speech. This audio data may then be added to audio data that is to be output on the speaker(s) of the wireless earbuds. For instance, the wireless earbuds may add a predefined amount of the user's speech, such as five percent, ten percent or the like, into the output audio signal in order to provide audible feedback to the user that is speaking while wearing the wireless earbuds.

Again, however, windy conditions may negatively impact the user experience of the sidetone mode. As above, the outer audio signals may include significant wind noise, which may be incoherent between the two or more outer microphones. Thus, the wind noise may be overtly and overly present in the audio data that is "piped" back into the ear canal of the user. Thus, the techniques described below may attenuate a gain of the sidetone mode in response to detecting a sufficient level of wind and, further, may disable the sidetone mode. For instance, in response to detecting the sufficient level of wind, the wireless earbuds may initially attenuate a gain of the sidetone mode at a predefined rate before disabling the sidetone mode completely. Further, upon detecting that the wind event has cleared (e.g., that the environment no longer includes significant wind), the techniques may enable the sidetone mode and increase the gain associated with the sidetone mode at a predefined rate until it reaches the original settings (or otherwise).

Before modifying operation of one or more modes of the wireless earbuds, however, the techniques may use the audio signals generated by the outer microphones to determine occurrence of a wind event. That is, the techniques may use these audio signals to determine when an ambient environment of the wireless earbuds is experiencing a sufficient level of wind, as measured in both magnitude and time, so as to modify operation of a mode executing on the wireless earbuds. Further, the techniques may determine when this wind event has cleared (e.g., when the wind is no longer sufficiently high) in order to re-modify (e.g., enable, increase a gain of, etc.) the operation of the mode on the wireless earbuds.

To detect such a wind event, a wireless earbud may generate a first audio signal, $x_1(n)$, using a first outer microphone of the wireless earbud and a second audio signal, $x_2(n)$, using a second outer microphone of the wireless earbud. Both the first and second audio signals may be generated and operated upon in the time domain. After generating the first and second audio signals, and potentially converting the signals from analog to digital, the techniques may calculate, for each frame, a difference between the first audio signal and the second audio signal and a sum of the first audio signal and second audio signal as follows:

$$x_{diff}(n)=x_1(n)-x_2(n)s \tag{1}$$

$$x_{sum}(n)=x_1(n)+x_2(n) \tag{2}$$

Given that wind is represented more in lower-frequency ranges of audio signals than higher-frequency ranges, after computing the difference and the sum the techniques may apply a low-pass filter to both the difference and the sum. For instance, the techniques may apply a low-pass filter with a cut-off frequency of 500 Hz to $x_{sum}(n)$ and $x_{diff}(n)$ in some instances. Further, these signals may be decimated in some instances, such as from thirty-two samples per frame at 16 kHz to thirty-two samples per frame at 1 kHz. Thereafter, the techniques may square the value of each of the sum and the difference signals for a frame, m, to generate their powers, $P_{sum}(m)$ and $P_{diff}(m)$, respectively.

After computing these powers for a given frame, the techniques may proceed to compute a likelihood that the frame represents meaningful wind and an approximation of a strength of the wind. To do so, the techniques may compute a ratio between the powers as follows:

$$R_{d/s}(m)=P_{diff}(m)/P_{sum}(m) \tag{3}$$

As described above, sound waves associated with wind may contact the first outer microphone of the wireless earbud differently than the second outer microphone. Thus, $P_{diff}(m)$ is generally large when significant wind is present and substantially equal to one when wind is not present. Thus, $R_{d/s}(m)$ is generally zero or near zero when no wind is present and closer to one when wind buffeting is present.

After computing the ratio, a continuous function for determining a current likelihood, L(m), that the wireless earbud is currently experiencing wind may be updated as follows:

$$L(m)=\min(L(m-1)+\alpha_L(c_L R_{d/s}(m)-L(m-1),1) \tag{4}$$

where $\alpha_L$ is a smoothing time constant between zero and one and $c_L$ is an adjusting constant which may be approximately one. In some instances, a larger $\alpha_L$ is used in instances where a likelihood of wind for a current frame is increasing relative to a current L(m) (i.e., when the wind is attacking) and a smaller $\alpha_L$ is used in instances where a likelihood of wind for a current frame is decreasing relative to a current L(m). By doing so, the techniques may respond to wind quickly and "hold" onto an existing wind for longer.

In addition to determining a likelihood of wind, L(m), the techniques may also determine a current strength of any potential wind. Given that a larger wind may increase the difference in the first and second audio signals, the estimated wind strength may be based on $P_{diff}(m)$. Thus, the techniques may update a continuous function for an estimated power of any wind as follows:

$$P(m)=P(m-1)+\alpha_P(P_{diff}(m)-P(m-1)) \tag{5}$$

where $\alpha_P$ is a smoothing time constant between zero and one. Further, in some instances the techniques may apply a warping function that utilizes a shifting factor and a normalization factor such that the resulting indication of the strength of the wind highlights differences in wind speed between a predefined range of interest, such as 5 mph and 10 mph in some instances. Thus, a warping function may be applied as follows:

$$S(m) = 2/\left(1 + 2^{\left(u_p - \log\left(\frac{P(m)}{\sigma_p}\right)\right)}\right) \tag{6}$$

where $u_p$ is a shifting factor representing the center of the predefined range of interest for log(P(m)) and $\sigma_p$ is a normalization factor defining the span of the range of interest.

After calculating the current value of the likelihood of wind, L(m), and the current strength of the wind, S(m), the techniques may calculate a current level of wind as follows:

$$\text{current level of wind}(m)=\min(L(m)S(m),1) \tag{7}$$

Thus, the techniques may calculate, for a given frame, m, a current level of wind between zero and one, where zero represents no wind and one represents significant wind (e.g., wind above the range of interest, such as above 10 mph). In some instances, the techniques may store these level-of-wind values between zero and one over time in order to make a determination regarding occurrence of a wind event, as well as occurrence of a clearance of a wind event.

For instance, in some instances the equations above may be tuned such that a level of wind over a first threshold value, such as 0.9, indicates significant wind and a level of wind over a second threshold value, such as 0.7, indicates moderate wind and, thus, levels of wind below 0.7 are determined not to be of significance for detecting a wind event.

For instance, in some instances the techniques may utilize a counter and corresponding logic to detect a wind event, which in turn may be used to modify a current mode of operation of the wireless earbuds. For instance, in response to a level of wind for a first frame, m, being above the first threshold, such as 0.9, the techniques may increment a counter, such as from a value of zero to a value of one. If, for a subsequent frame, m+1, the level of wind is also above the first threshold, then the techniques may increment the counter from one to two, and so forth. Further, if a level of wind for yet another subsequent frame, m+2, is less than the first threshold (e.g., 0.9) but greater than the second threshold (e.g., 0.7), then the techniques may refrain from altering the value of the counter If a level of wind for a subsequent frame, m+3, is less than both the first and second threshold (e.g., less than 0.7), then the techniques may clear the counter (i.e., reset the value to zero).

Further, the techniques may store a predefined value that, when met or exceeded by the counter, results in detection of a wind event, which may result in modification of a mode operating on the wireless earbuds. In some instances, this predefined value may vary based on a current mode of operation of the wireless earbud. For instance, the techniques may set the predefined value as relatively small (e.g., four frames) for the ANC mode, while setting the predefined value as relatively large (e.g., six hundred frames) for the sidetone and passthrough modes.

Thus, in instances where the wireless earbud is operating in ANC mode and the counter value reaches four, the techniques may modify the ANC mode by, for example, attenuating the ANC mode at a predefined rate before disabling the ANC mode. For instance, the techniques may attenuate the ANC mode from 0 dB to −6 dB at a rate of 0.025 dB/ms before disabling the ANC mode. In instances where the wireless earbud is operating in sidetone mode, however, and upon the counter value reaching six hundred the techniques may modify the sidetone mode by, for example, attenuating the sidetone mode at a predefined rate before disabling the sidetone mode. For instance, the techniques may attenuate the sidetone mode from 0 dB to −20 dB at a rate of 0.025 dB/ms before disabling the sidetone mode. When operating in passthrough mode, however, the techniques may modify the passthrough mode by, for example, attenuating the passthrough mode in response to the counter value reaching six hundred. For instance, the techniques may attenuate the passthrough mode from 0 dB to a target gain at a rate of 0.025 dB/ms, where the target gain may be defined on a current passthrough setting defined by a user of the wireless earbuds. The target gain may be, for instance, between −3 dB and −12 dB. For instance, the wireless earbuds may be configurable at a number of passthrough settings, such as four different passthrough settings. Each setting may be associated with a certain level of environmental noise being "passed through" into the speaker and, thus, ear canal of the user. Regardless of which setting a user configures the earbuds to operate at, this feature may be attenuated (and thus the amount of passed through environmental noise may be lessened) when a wind event is detected. Of course, while the examples described herein provide example values, other values may be used.

After detecting a wind event and modifying a currently operating mode of the wireless earbuds, the wireless earbuds may also determine when the wind event has been cleared. In response to making this determination, the techniques may re-modify the mode by, for instance, re-enabling the mode and/or increasing the gain associated with the mode (e.g., back to the pre-wind-event settings or otherwise). In some instances, the techniques may determine that a wind event has been cleared by using the counter described above. For instance, after detecting a wind event, the techniques may reset the value of the counter to zero. Thereafter, upon receiving a level of wind between zero and one, the techniques may determine whether the level of wind is less than the second threshold, such as 0.7 If so, meaning that the level of wind for that frame is relatively low, then the techniques may increment the value of the counter from zero to one. If a subsequent frame is also below the second threshold, the techniques may update the value of the counter again. If, however, the level of wind is greater than the second threshold but less than the first threshold (e.g., 0.9), the techniques may refrain from updating the value of the counter. If a level of wind is received that is greater than both the first and second threshold values, then the value of the counter may be reset to zero. Upon the value of the counter reaching or exceeding a predefined value, the techniques may modify the current mode of the earbuds by, for example, re-enabling the mode and/or increasing a gain of the mode. In some instances, when a first wireless earbud of a pair of wireless earbuds determines that a wind event has cleared, this first wireless earbud may "check in" with a second wireless earbud of the pair of earbuds to determine whether the second wireless earbud has also determined that the wind event has cleared. If both earbuds have determined that the wind event has cleared, then both earbuds may re-modify the parameters of the mode (e.g., enable the mode and increase its gain) in a synchronized manner. In some instances, however, if one of the earbuds has not determined that the wind event has cleared, then both wireless earbuds may refrain from restoring or otherwise re-modifying the parameters of the mode. Thus, in some instances, detection of a wind event by a single earbud may result in modification of a mode at both earbuds, while a determination by both earbuds that a wind event has cleared may be necessary to restore or otherwise remodify the parameters. In other instances, the opposite may be true, and in still other instances both earbuds may modify and restore the parameters based on a single earbud detecting a wind event and a single earbud determining that the wind event has cleared, respectively.

Again, the predefined value for determining a clearance of a wind event may be dependent on the current mode. For instance, the techniques may set a value of four for the ANC mode, and thirty for both the sidetone mode and the passthrough mode. Thus, upon the techniques determining that a value of the counter has reached thirty after disabling the ANC mode due to a wind event, the techniques may re-enable the ANC mode on the wireless earbuds and increase the gain back to 0 dB at a rate of 0.012 dB/ms. Upon the techniques determining that a value of the counter has reached four after disabling the sidetone mode due to a wind event, meanwhile, the techniques may re-enable the sidetone mode on the wireless earbuds and increase the gain back to 0 dB at a rate of 0.012 dB/ms. Finally, upon the techniques determining that a value of the counter has reached thirty after attenuating the passthrough mode due to a wind event, the techniques may increase a gain of the passthrough mode on the wireless earbuds back to 0 dB at a rate of 0.012 dB/ms.

As will be appreciated, the described techniques thus detect current wind levels on a frame-by-frame basis in a low-power manner, given that input audio signals are processed and analyzed in the time domain. Further, the techniques utilize a counter system to detect a wind event indicating a significant amount of wind, defined in terms of both magnitude and time/persistence. Further, the techniques describe modifying one or more parameters associated with a current mode being executed on the wireless earbuds or other headphones in response to detecting the wind event, thus increasing the quality of a user experience for a user wearing and operating the wireless earbuds.

Finally, the techniques describe processes for detecting cessation of a wind event and re-modifying the parameters associated with the current mode of operation being executed on the wireless earbuds. While a few example modes are described it is to be appreciated that any other modes may be used by the wireless earbuds or other electronic devices and, further, may be modified in response to detection of a wind event that may degrade a user experience if not mitigated.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative environment 100 in which a user 102 wears a hearable device, in this example wireless earbuds 104(1) and 104(2) that include speakers for outputting audio, such as audio received from a mobile device 106 of the user 102. In addition, the wireless earbuds 104(1) and 104(2) may include microphones generating audio signals, such as audio signals representing speech of the user 102 or audio signals representing ambient noise in the environment, such as wind 112. In some instances, one or more of the wireless earbuds 104(1) and/or 104(2) may be configured to generate one or more audio signals representing speech of the user and, potentially, other ambient noise and send the audio signals to a mobile device 106 of the user 102. In some instances, such as when the user 102 is operating the mobile device 106 to engage in a communication session with another user operating another device 108, the mobile device 106 may then send the generated audio signals for output to the other user via the mobile device 108 of the other user. Of course, it is to be appreciated that the techniques for detecting wind and modifying a mode of operation on the wireless earbuds 104 may be performed without regard to whether or not the mobile device 106 and/or earbuds 104 are exchanging data with other devices 108 over a network 110. Furthermore, while the techniques below are described with reference to a wireless earbud, it is to be appreciated that the techniques may apply equally to other headphones and electronic devices.

As illustrated, in some instances the environment of the user 102 may include the wind 112 or other unwanted environmental noise. As such, one or more of the wireless earbuds 104(1) and 104(2) may include components configured to detect the presence of wind in audio signals generated by one or more of the earbuds and, in response, may modify a mode of operation executing on the wireless earbuds 104 to lessen the impact of the wind on these modes. That is, one or both of the wireless earbuds 104(1) and 104(2) may be configured to decrease the presence of the wind 112 in generated audio signals, communicate presence of this wind to the other earbud, and modify a mode operating on the earbud.

As illustrated, the first wireless earbud 104(1) may include one or more network interfaces 114, one or processors 116, one or more microphones 118, one or more loudspeakers 120, and memory 122. The network interfaces 114 may configure the wireless earbud 104(1) to communicate over one or more wired and/or wireless networks to send and receive data with various computing devices, such as the mobile device 106, one or more remote systems, and/or the like. Generally, the network interface(s) 114 enable the wireless earbud 104(1) to communicate over any type of network, such as a wired network (e.g., USB, Auxiliary, cable etc.), as well as wireless networks (e.g., WiFi, Bluetooth, Personal Area Networks, Wide Area Networks, and so forth). In some examples, the network interface(s) 114 may include a wireless unit coupled to an antenna to facilitate wireless connection to a network. However, the network interface(s) may include any type of component (e.g., hardware, software, firmware, etc.) usable by the wireless earbud 104(1) to communicate over any type of wired or wireless network. The network interface(s) 114 may enable the wireless earbud 104(1) to communicate over networks such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such network interface(s) 114 may include radio transceivers and associated control circuits and logic for implementing appropriate communication protocols.

The one or more microphones 118, meanwhile, may be configured to generate audio signals representing speech of the user 102 and/or environmental noise surrounding the user 102, such as the illustrated wind 112. In some instances, the microphones 118 may generate audio signals representing user speech in response to a user input, such as in response to a physical input at the wireless earbud 104(1) or at the mobile device 106, a wake word received at the wireless earbud 104(1) or at the mobile device 106, or in response to any other input. In addition, or in the alternative, the microphones 118 may generate audio signals indicative of the environmental noise, such as the wind 112, periodically or continually in order to modify operation of a mode of the earbuds, such as ANC mode, sidetone mode, passthrough mode, or the like. In some instances, when the earbuds 104 are placed into a particular mode, the earbuds may begin generating the audio signals and analyzing the audio signals to determine whether a wind event is occurring and, if so, in order to modify operation of the mode, as described above and in further detail below.

In some instances, the microphones 118 include a first, outward-facing microphone, a second, outward-facing microphone, and a third, inward-facing microphone. That is, the first and second microphones may reside outside of the ear canal of the user and may be oriented towards a mouth of the user 102. Thus, the first and second microphones may be exposed to environmental noise, such as the illustrated wind 112. The third, inward-facing microphone, meanwhile, may reside within an ear canal of the user 102 and, thus, may be isolated from environmental noise, such as the wind 112. The one or more loudspeakers 120, meanwhile, may also reside within the ear canal of the user and may be configured to output received audio signals corresponding to any type of audio, such as speech of the user 102, music, audio books, and/or the like.

The one or more processors 116 may include a central processing unit (CPU) for processing data and computer-readable instructions, and the memory 122 may comprise computer-readable storage media storing the computer-readable instructions that are executable on the processor(s) 116. The memory 122 may include volatile random access memory (RAM), non-volatile read only memory (ROM), non-volatile magnetoresistive (MRAM) and/or other types of memory for storing one or more components. As illustrated, the memory 122 may store an audio-processing component 124, a mode-configuration component 126, a wind-detection component 128, and a mode-modification component 130.

The audio-processing component 124 may function to perform an array of audio-processing techniques on generated audio signals, such as audio signals generated based on speech of the user 102. For instance, the audio-processing component 124 may perform acoustic and echo cancelation (AEC) techniques and/or the like.

The mode-configuration component 126 may enable a user 102 or, potentially, applications operating on the mobile device 106 to enable one or more particular modes on the wireless earbuds 104. For example, the wireless earbuds may be configured to operate in different modes, such as an active-noise-control (ANC) mode, a passthrough mode, a sidetone mode, and/or the like, each of which may be turned on based on an input from the user 106 or otherwise. It is to be appreciated that while several example modes are described herein, the wireless earbuds 104 may operate other suitable modes.

As introduced above, the mode-configuration component 126 may enable an ANC mode, which may function to reduce the amount of environmental noise heard by a user wearing the wireless earbuds, such as passing cars in the environment, the conversation of other users, or other background noise in the environment. For instance, when the user 106 activates ANC mode on their wireless earbuds 104, the wireless earbuds 104 may generate, using one or more of the outer microphones 118 of the earbuds 104, audio data representative of the environmental noise. The earbuds 104 may then use this audio data to "cancel out" the environmental noise experienced by the user 106. For instance, the earbuds 104 may use the audio data to generate sound that is out of phase with the environmental noise and may inject this sound into a reference signal that is to be played out by speaker(s) 120 of the wireless earbuds 104. Thus, the out-of-phase audio data effectively "cancels" the environmental noise from the audio signal output by the speaker(s) 120.

Further, the mode-configuration component 126 may enable a passthrough mode, which attempts to replicate environmental noises surrounding the user 102 in an audio signal output by speaker(s) 120 of the wireless earbuds 104 so that the user 102 can essentially "hear" what is happening in their ambient environment. For instance, the wireless earbuds 104 may use one or more of the outer microphones to generate audio data representative of the environmental noise and may add sound corresponding to the noise to an audio signal to be output by the speakers 120, such that the user 102 will hear sound similar to what they would hear if they were not wearing the earbuds 104. In short, this mode enables the environmental noise to "passthrough" the earbuds 104 into the ear of the user 102. Further, in some instances the mode-configuration component 126 may enable to the user to select which of multiple passthrough settings to implement at the wireless earbuds 104, with each passthrough setting providing a different level of ambient noise to the speaker 120 and, hence, into the ear canal of the user 102.

In addition, the mode-configuration component 126 may enable a sidetone mode, which may operate on the wireless earbuds 104 when the mobile device 106 of the user 102 is engaging in a communication session (e.g., phone call, video call, etc.) with another user and/or another user device, such as one of the user devices 108. For instance, sidetone mode may operate by using the outer microphones of the earbuds 104 to generate audio data indicative of the user 102 speaking during the communication session and may generate audio data representative of this user speech. This audio data may then be added to audio data that is to be output on the speaker(s) 120 of the wireless earbuds 104. For instance, the wireless earbuds 104 may add a predefined amount of the user's speech, such as five percent, ten percent or the like, into the output audio signal in order to provide audible feedback to the user 102 that is speaking while wearing the wireless earbuds 104.

However, in some instances the variable and incoherent properties of the wind 112 may lessen the effectiveness of these different modes, such as the ANC mode, the passthrough mode, and the sidetone mode. For instance, given that sound waves associated with the wind 112 may strike the first outer microphone of a wireless earbud 104 quite differently than the second outer microphone, first audio data generated by the first outer microphone may differ greatly from second audio data generated by the second outer microphone. That is, the first and second audio data may have a relatively low level of coherence to one another. Thus, attempting to cancel out the sound of wind from audio output to the user 102 may be difficult. Similarly, performance of the passthrough mode may be less than ideal when operating in windy conditions. Given that sounds waves associated with wind physical strike the outer microphones, and strike them differently as discussed above, outputting audio data based on this wind and adding this audio data for output into an ear canal of the user 102 may result in a poor user experience. In addition, windy conditions may negatively impact the user experience of the sidetone mode. As above, the outer audio signals may include significant wind noise, which may be incoherent between the two or more outer microphones. Thus, the wind noise may be overtly and overly present in the audio data that is "piped" back into the ear canal of the user.

For this and potentially other reasons, the mode-modification component 130 may modify operation (e.g., parameters) associated with features of the respective modes in response to receiving an indication of a wind event from the wind-detection component 128. For instance, the mode-modification component 130 may attenuate a gain associated with ANC mode before disabling the mode when operating in windy conditions. In some instances, the wind-detection component 128 may detect a level of wind that is greater than a threshold (e.g., based on both magnitude and length of time) and, in response, may attenuate operation of the ANC mode at a predefined rate before disabling the ANC mode. Upon the wind-detection component 128 determining the wind event has cleared (e.g., that the wind has sufficiently stopped or settled), the mode-modification component 130 may re-enable the ANC mode and increase the gain of the ANC mode at a predefined rate back to the original settings (or to some other settings).

Similarly, the mode-modification component 130 may modify operation (e.g., parameters) of passthrough mode when passthrough mode is being operated in windy conditions. For instance, in response to the wind-detection component 128 detecting a wind event, the mode-modification component 130 may attenuate (and/or disable) the passthrough mode. In some instances, the mode-modification component 130 may attenuate a gain associated with the passthrough mode such that the user is still able to "hear" some of the environmental noise, while lessening the impact of the relatively strong wind on the output audio data. Further, upon the wind-detection component 128 determining that the wind event has cleared (e.g., that the environment no longer includes significant wind), the mode-modification component 130 may increase the gain associated with the passthrough mode at a predefined rate until it reaches the original settings (or otherwise).

Further, the mode-modification component 130 may attenuate a gain of the sidetone mode in response to the wind-detection component 128 detecting a sufficient level of wind and, further, may disable the sidetone mode. For instance, in response to determining occurrence of wind event, the mode-modification component 130 may initially attenuate a gain of the sidetone mode at a predefined rate before disabling the sidetone mode completely. Further, upon detecting that the wind event has cleared (e.g., that the environment no longer includes significant wind), the mode-modification component 130 may enable the sidetone mode and increase the gain associated with the sidetone mode at a predefined rate until it reaches the original settings (or otherwise).

Before the mode-modification component 130 modifies operation of one or more modes of the wireless earbuds 104, however, the wind-detection component 128 may use the audio signals generated by the outer microphones to determine occurrence of a wind event. That is, the wind-detection component 128 may use these audio signals to determine when the wind 112 is sufficient, as measured in both magnitude and time, so as to modify operation of a mode executing on the wireless earbuds 104. Further, the wind-detection component 128 may determine when this wind event has cleared (e.g., when the wind is no longer sufficiently high) in order to re-modify (e.g., enable, increase a gain of, etc.) the operation of the mode on the wireless earbuds. Operation of the wind-detection component 128 is described below in further detail with reference FIGS. 3 and 4

It is to be appreciated that by generating the output audio signal(s) in this manner, the wireless earbud(s) may lessen the impact of any wind or other unwanted environmental noise on the quality of audio that is output using the generated output audio signals. That is, by alleviating the impact of wind or other unwanted environmental noise on the resulting output audio signals, the quality of resulting audio may be higher than would result from outputting audio signals that have not been processed based on the presence of wind or unwanted noise.

Thus, as described above, one or both of the wireless earbuds 104(1) and 104(2) may include an instance of the wind-detection component 128 to detect the presence of wind in audio signals generated by the respective earbud, as well as an instance of the mode-modification component 130 to modify a mode operating on these earbuds 104. That is, one or more of the wireless earbuds 104(1) and 104(2) may be configured to mitigate the effects of the wind 112 in the output audio signal output by the speakers 120.

Further, and as introduced above, one or more of the wireless earbuds may include components that enable the earbuds to perform various operations based on the voice commands, such as streaming audio data (e.g., music) and outputting the audio data using an in-ear speaker, performing a telephone call, and so forth. In some examples, the wireless earbud 104(1) may be a sophisticated voice-enabled device that include components for processing the voice commands to determine respective intents of the voice commands of the user 102, and further determining an operation that the wireless earbud 104(1) is to perform based on each respective intent of the voice command of the user 102. However, the wireless earbud 104(1) may, in some examples, have less functionality and may simply perform some types of pre-processing on audio data representing the voice commands of the user 102. For instance, the wireless earbud 104(1) may merely serve as an interface or "middle man" between a remote system, or server, and the user 102. In this way, the more intensive processing used for speech processing may be performed using large amounts of resources of remote services.

Accordingly, the wireless earbud 104(1) may include the network interfaces 114 which configure the wireless earbud 104(1) to communicate over one or more networks to send and receive data with various computing devices, such as one or more remote systems which may include various network-accessible resources. In some examples, the remote system(s) may be a speech processing system (e.g., "cloud-based system," "software as a service (SaaS)," "network-accessible system," etc.) which receives audio data from the wireless earbud 104(1) representing a voice command of the user 102. For instance, the wireless earbud 104(1) may receive a "wake" trigger (e.g., wake word) which indicates to the wireless earbud 104(1) that the user 102 is speaking a voice command, and the wireless earbud 104(1) may begin streaming, via a network interface and over the network(s), audio data representing the voice command as captured by the microphones of the wireless earbud 104(1) to the remote system(s). However, in some examples, the wireless earbud 104(1) may be unable to, or refrain from doing so to conserve power, communicate over certain network(s) (e.g., wide-area networks). In such examples, the wireless earbud 104(1) may be communicatively coupled to a user device, such as the mobile device 106, in the environment 100 of the user 102. The wireless earbud 104(1) may communicate audio data representing the voice command to the user device 106 using the network interfaces and over another network (e.g., Bluetooth, WiFi, etc.). The user device 106 may be configured to, in turn, transmit the audio data representing the voice command to the remote system(s) over the network(s).

Figure 2:
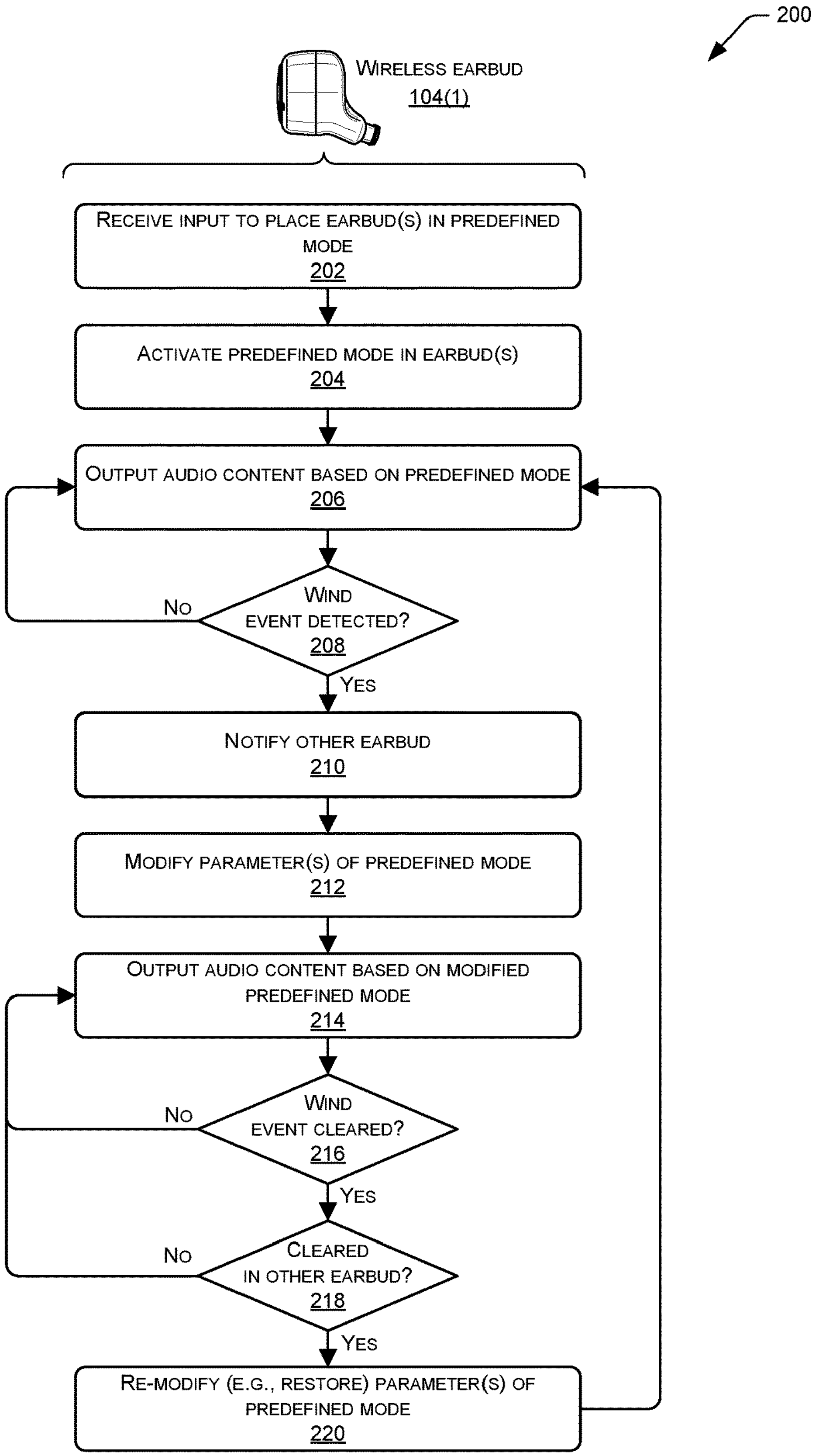
FIG. 2 illustrates a flow diagram of an example process that a wireless earbud from FIG. 1 may implement to detect a wind event, modify parameters(s) associated with a mode currently implemented by the earbud in response to detecting the wind event, determine that the wind event has cleared, and re-modify (e.g., restore) the parameters in response to determining that the wind event has cleared.

FIG. 2 illustrates a flow diagram of an example process 200 that the wireless earbud 104(1) and/or 104(2) may implement to detect a wind event, modify parameters(s) associated with a mode currently be implemented by the earbud in response to detecting the wind event, determine that the wind event has cleared, and re-modify the parameters in response to determining that the wind event has cleared.

The example processes described herein are illustrated as logical flow graphs, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described in the example processes is not intended to be construed as a limitation, and any number of the described operations can be combined in any order and/or in parallel to implement the respective process. Further, while FIG. 2 and other processes described herein are illustrated and described as being performed by different components of a wireless earbud, it is to be appreciated that some or all of these processes may instead be performed by a user device, remote servers, and/or the like.

At an operation 202, the example wireless earbud 104(1) receives an input to place the wireless earbud 104(1) into a predefined mode, such as the ANC mode, the sidetone mode, the passthrough mode, or the like. In some instances, the user 102 may provide the request to activate the predefined mode, such as via a button push on the wireless earbud 104(1), via a voice command to the wireless earbud 104(1), via an input to the mobile device 106 coupled to the wireless earbud 104(1), or the like. In other instances, an application executing on the wireless earbud 104(1), or the wireless earbud 104(1), may provide the input to enter the mode. For instance, in response to a user operating the mobile device to place a call via a communication application executing on the mobile device, the communication application may instruct the wireless earbud 104(1) (and the wireless earbud 104(2)) to enter the sidetone mode.

At an operation 204, the wireless earbud 104(1) activates the predefined mode in response to receiving the input. For instance, the mode-configuration component 126 may alter one or more parameters (e.g., a gain) associated with one or more features of the mode. For instance, the mode-configuration component may enable the feature(s) of the mode, attenuate a gain associated with the feature(s), or the like.

At an operation 206, the wireless earbud 104(1) outputs audio content based on the predefined mode. For instance, the wireless earbud 104(1) may output audio content on the speaker 120, such as an output audio signal including output audio (e.g., music, an eBook, etc.) as modified by the mode, such as modified to include environmental noise, modified to cancel environmental noise, modified to include sidetone, or the like.

At an operation 208, the wireless earbud 104(1) determines whether a wind event has been detected. For instance, this operation represents the wind-detection component 128 determining whether a wind event has been detected, or the mode-modification component 130 determining whether a wind event has been detected based on wind levels received from the wind-detection component 128. An example process for detecting a wind event is described below with reference to FIG. 8, which may be performed by the wind-detection component 128, the mode-modification component 130, and/or another component of the wireless earbud 104(1).

If the wireless earbud 104(1) does not detect a wind event, then the wireless earbud 104(1) continues to output the audio content at the operation 206. Upon detecting the wind event, however, at an operation 210 the wireless earbud 104(1) may notify the second wireless earbud 104(2) of the pair of the wireless earbuds. For instance, the wireless earbud 104(1) may send an indication of the wind event to the second wireless earbud 104(2), may send an instruction to modify a mode to the second wireless earbud 104(2), or the like. While not illustrated, in some instances the wireless earbud 104(1) may check with the second wireless earbud 104(2) to determine whether it also detected the wind event before modifying features of the predefined mode.

In this example however, at an operation 212 the wireless earbud 104(1) modifies parameter(s) associated with one or more features of the predefined mode. For instance, the wireless earbud 104(1) may attenuate a gain of the feature(s) of the mode (e.g., at a predefined rate), disable the feature(s) of the mode (e.g., after attenuating the gain to zero), and/or the like.

At an operation 214, the wireless earbud 104(1) outputs audio content based on the modified predefined mode. That is, this operation represents the wireless earbud 104(1) outputting the audio content on the speaker 120 after modifying the parameters of the mode.

At an operation 216, the wireless earbud 104(1) determines whether the wind event has cleared. For instance, this operation represents the wind-detection component 128 determining whether the wind event has cleared, or the mode-modification component 130 determining whether the wind event has cleared based on wind levels received from the wind-detection component 128. An example process for determining that a wind event has cleared is described below with reference to FIG. 9, which may be performed by the wind-detection component 128, the mode-modification component 130, and/or another component of the wireless earbud 104(1).

If the wireless earbud 104(1) does not determine that the wind event has cleared, then the wireless earbud 104(1) continues to output the audio content at the operation 214. Upon determining that the wind event has cleared, however, at an operation 218 the wireless earbud 104(1) may determine whether the second wireless earbud 104(2) of the pair of the wireless earbuds has also determined that the wind event has cleared. If not, then the wireless earbud 104(1) may continue to output the audio content as described above with reference to the operation 214. If both earbuds have determined that the wind event has cleared, however, then at an operation 220 the wireless earbud 104(1) may re-modify the parameters of the mode, such as by restoring the parameters back to their values before detection of the wind event. In some instances, however, the wireless earbud 104(1) may choose and implement different parameter values based on a current level of wind, with these values differing from the original, pre-wind-event values. In either of these instances, the wireless earbud 104(1) may enable and/or increase the gain of the feature(s) of the mode over time and at a predefined rate. Further, after doing so, the wireless earbud 104(1) may return to outputting the audio content as described above with reference to the operation 206. In addition, the wireless earbud 104(1) may again monitor for a wind event.

While this process 200 is described with reference to the wireless earbud determining the wind event and determining when the wind event clears, it is to be appreciated that either of the wireless earbuds 104(1) and 104(2) may receive an indication of the wind event from the other earbud and, in response, modify the feature(s) of the mode currently active on the earbuds in response. Further, either earbud may receive an indication that the wind event has cleared from the other earbud and, in response, may either re-modify (e.g., restore) the parameters of the feature(s) or determine itself whether the wind event has also cleared before re-modifying the parameters and sending an indication that the wind event has also cleared back to the other earbud.

Figure 3:
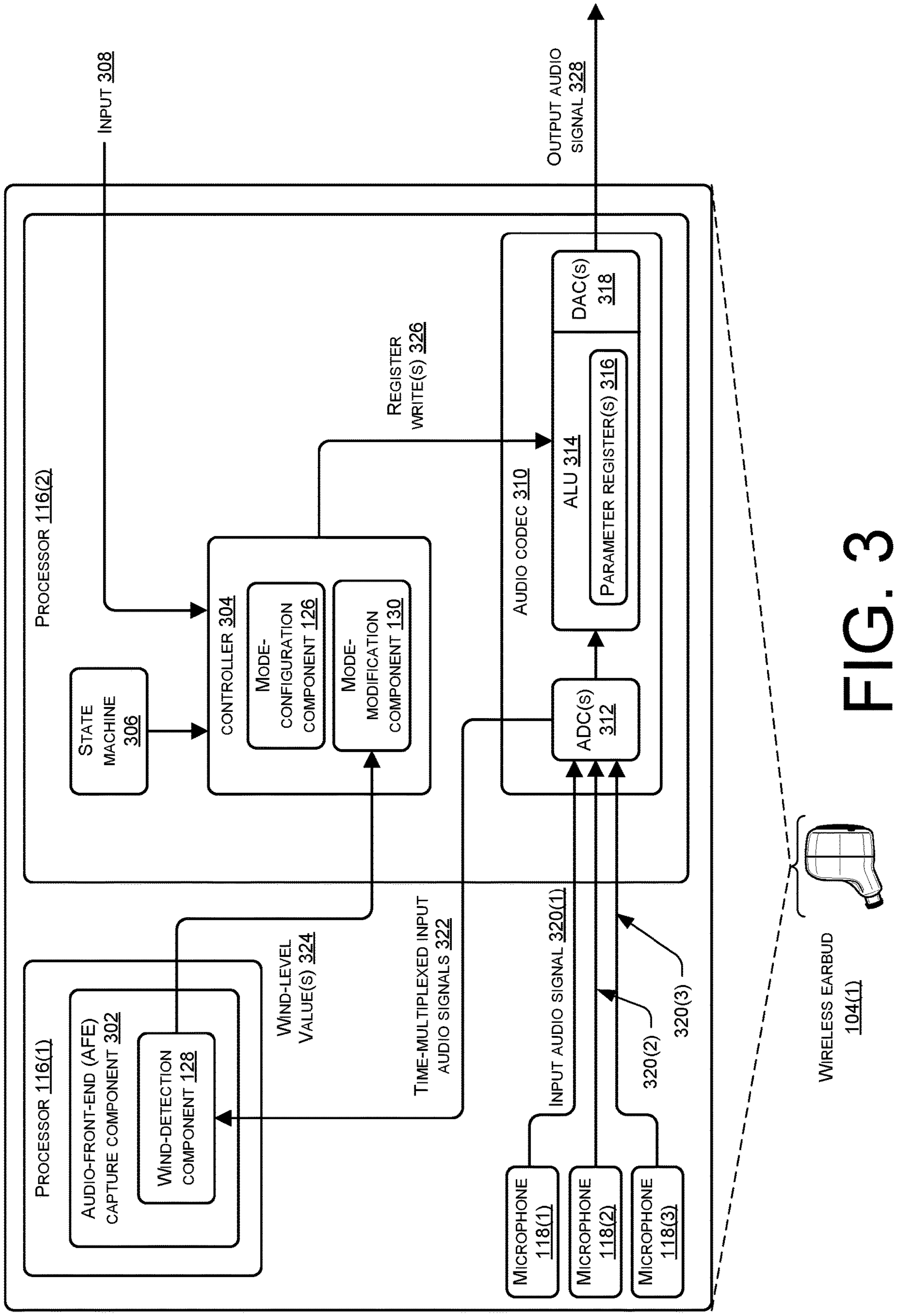
FIG. 3 illustrates example components of a wireless earbud, such as a wind-detection component for detecting a wind event and a mode-modification component for modifying parameters of a mode of the earbud in response to detecting the wind event.
Figure 4:
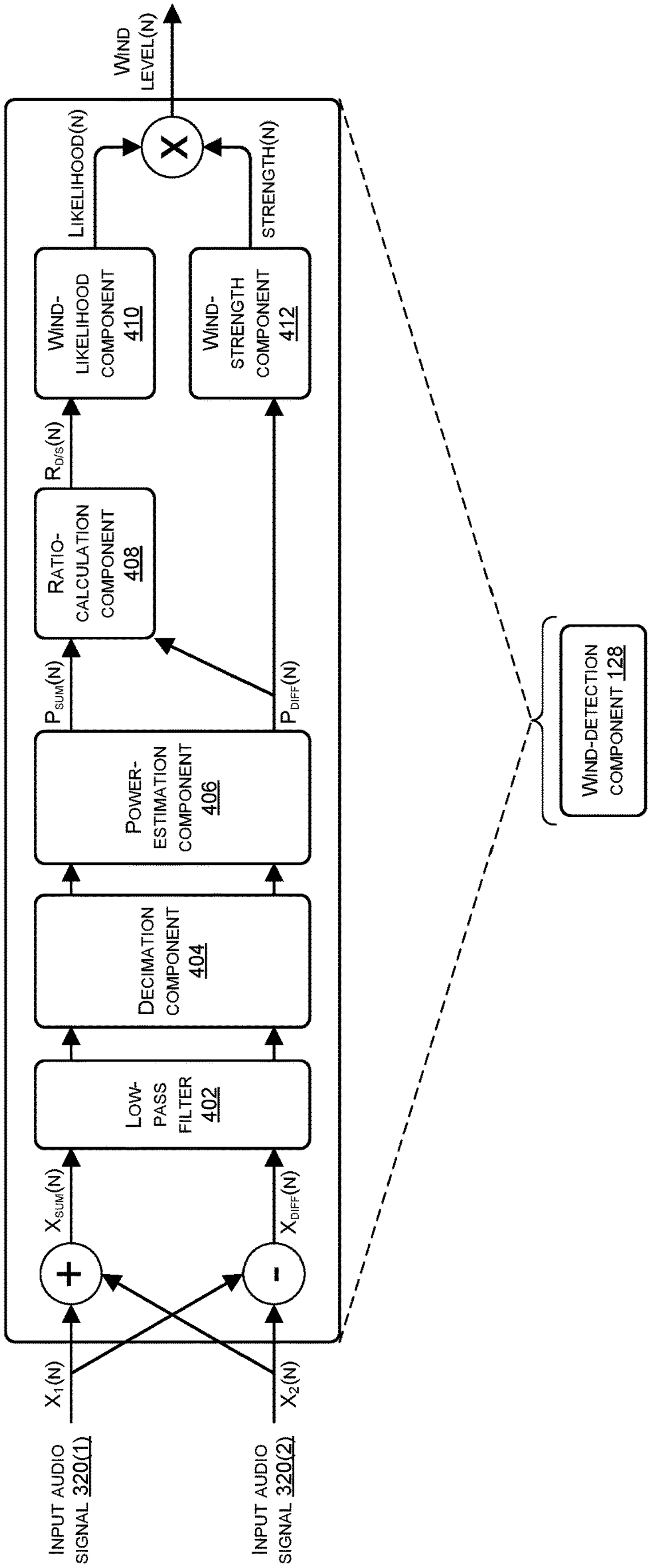
FIG. 4 illustrates example components of the wind-detection component. As illustrated, the wind-detection component may use at least two audio signals generated by respective microphones of the earbud to determine a likelihood that wind is occurring for a given frame and a strength of the wind at the given frame. These two pieces of information may be used (e.g., as a product) to generate data indicating a current level of wind for the given frame.
Figure 5:
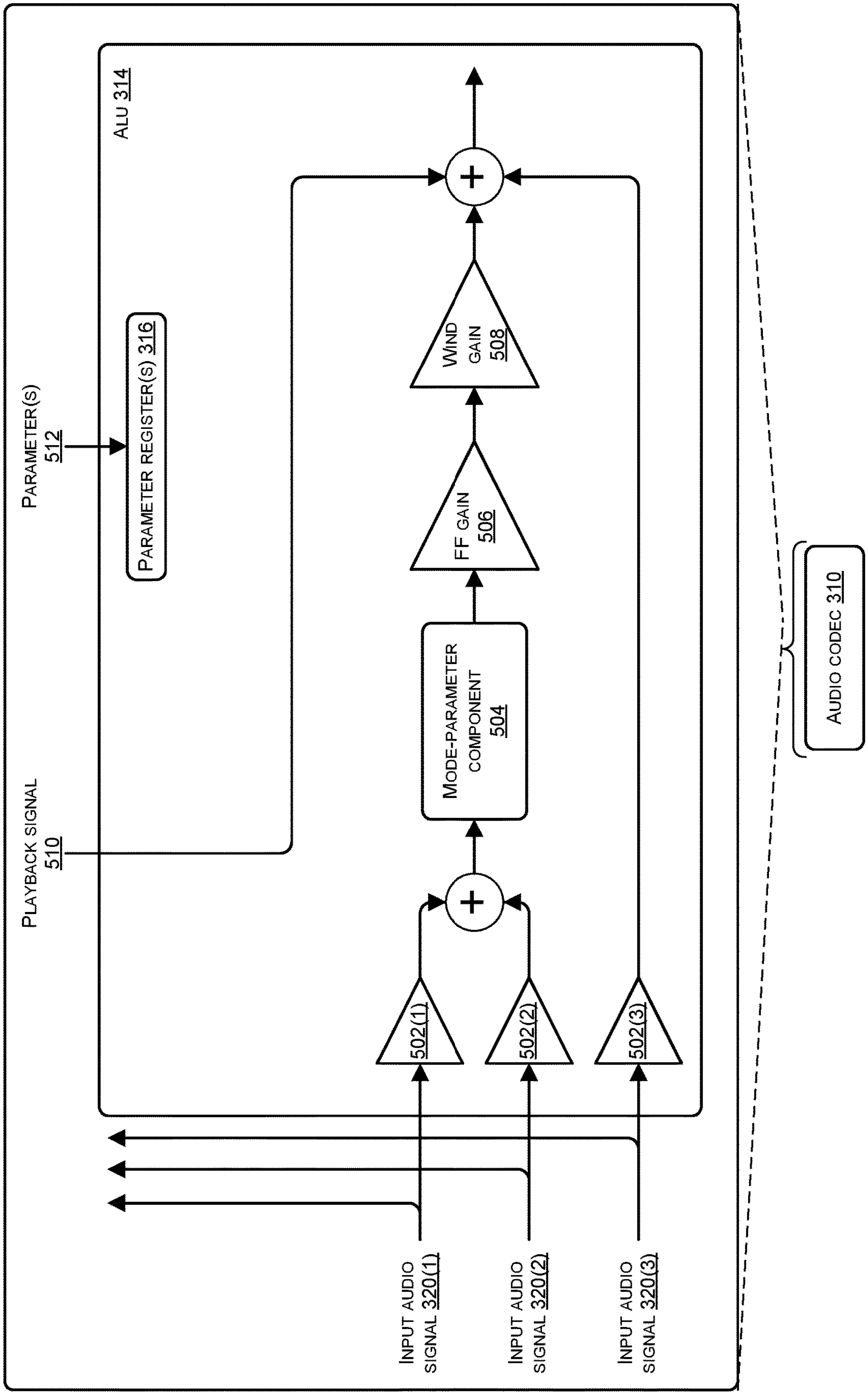
FIG. 5 illustrates example components of an example audio codec of a wireless earbud. As illustrated, the audio codec includes sub-components for modifying parameters (e.g., gain) associated with a mode executing on the wireless earbud, such as in response to detecting a wind event or determining that a wind event has cleared.

FIG. 3 illustrates example components of the wireless earbud 104(1), such as the wind-detection component 128 for detecting a wind event (or wind-level values for detecting the wind event) and the mode-modification component 130 for modifying parameters of a mode of the earbud 104(1) in response to detecting the wind event. While FIG. 3 illustrates one example configuration, it is to be appreciated that the wireless earbud 104(1), or other electronic devices implementing the techniques for detecting a wind event and/or modifying a mode in response to detecting a wind event may utilize any other configuration. Further, it is to be appreciate that this figure, as well FIGS. 4 and 5, illustrate example components pertinent to the wind-detection and wind-mitigation techniques, and that the wireless earbud 104(1) may include other components for processing both input audio signals and output audio signals.

As illustrated, in this example the wireless earbud includes a first processor 116(1) and a second processor 116(2). In some instances, one or both of these processors may comprise central processing units (CPUs), while in other instances one or both of these processors may comprise system(s) on a chip (SOC) or the like. Regardless, FIG. 3 illustrates that first processor 116(1) may include an audio-front-end (AFE) capture component 302, which may store, among other components, the wind-detection component 128. The second processor 116(2), meanwhile, may store a controller 304 and a state machine 306. As illustrated, the controller 304 may include the mode-configuration component 126, which function, in part, to configure the earbud 104(1) to execute different modes by altering parameters associated with a feature(s) of the different modes. For instance, the mode-configuration component 126 may configure these parameters based an input 308 (e.g., a user or application input requesting to implement a particular mode), as well as based on input from the state machine 306 indicating a current state of the wireless earbud 104(1).

As illustrated, the processor 116(2) may further include an audio codec 310, which may store one or more analog-to-digital converters (ADCs) 312, an arithmetic-and-logic unit (ALU) 314 that includes one or more parameter registers 316, and one or more digital-to-analog conversations (DACs) 318.

Within this example architecture, a first outer microphone 118(1) of the wireless earbud 104(1) may generate a first audio signal 320(1), a second outer microphone 118(2) of the wireless earbud 104(1) may generate a second audio signal 320(2), and an inner microphone 118(3) of the wireless earbud 104(1) may generate a third audio signal 320(3). As illustrated, each of these audio signals may be input to the ADCs 312 of the audio codec 310 to be digitized, after which these signals may be input to the ALU 314. In addition, however, time-multiplexed versions of the input audio signals 322 may also be input to the wind-detection component 128 of the AFE capture component 302. The wind-detection component 128 may function to calculate, for each frame of the audio signals, a wind-level value indicative of a product of a current likelihood of wind and a current strength of the wind. For instance, the wind-detection component 128 may perform techniques similar or the same as that discussed below with reference to FIGS. 4 and 6 to calculate these wind levels.

Further, in some instances the wind-level detection component 128 may output these wind-level values 324 on a per-frame basis to the mode-modification component 130 stored on the controller 304. The mode-modification component 130 may then use these values 324 to determine whether a wind event is occurring. For instance, the mode-modification component 130 may use the values to determine whether a wind event is occurring using techniques similar or the same as techniques described below with reference to FIGS. 8 and 9. In some instances, however, the wind-detection component 128 may use the wind-level values to determine the occurrence or clearance of the wind event (e.g., using the techniques of FIGS. 8 and 9) and, thus, may output an indication of a wind event or an indication of a clearance of a wind event to the mode-modification component 130 in addition or in the alternative to the wind-level values. Stated otherwise, either or both of the wind-detection component 128 and the mode-modification component 130 may use the wind-level values to detect the occurrence of a wind event and the clearance of the wind event.

In each of these instances, the controller 304 may perform register writes 326 to the parameter registers of the ALU 314 in order to modify feature(s) of an active mode of the earbud 104(1) in response to receiving an instruction from the mode-modification component 130. That is, the controller 304 may receive new parameter values from the mode-modification component 130 for attenuating a feature and/or disabling a feature, and may perform the register writes 326 on the parameter registers 316 such that the ALU will execute these modifications. FIG. 5 illustrates the ALU in additional detail and is described below. Finally, the DACs convert the now-modified audio signals back to the analog domain and output an output audio signal 328, which may be further processed before being sent to the speaker 120 for output to a user.

FIG. 4 illustrates example components of the wind-detection component 128. As illustrated, the wind-detection component 128 may use at least two audio signals generated by respective microphones 118 of the earbud 104(1) to determine a likelihood that wind is occurring for a given frame and a strength of the wind at the given frame. These two pieces of information may be used (e.g., as a product) to generate data indicating a current level of wind for the given frame.

For instance, FIG. 4 illustrates that the wind-detection component 128 may receive the input audio signals 320(1) and 320(2) from the outer microphones 118(1) and 118(2), respectively. In some instances, these audio signals may be generated and processed in the time domain and, thus, have not undergone extensive audio processing. Thus, the wind-detection component 128 may be configured to generate wind-level values with a great deal of power consumption at the earbud or other electronic device.

As illustrated, the first audio signal 320(1) may be designated $x_1(n)$, while the second audio signal may be designated as $x_2(n)$. These audio signals may be summed as $x_{sum}(n)$, while a difference between these signals may be computed as $x_{diff}(n)$ as follows:

$$x_{diff}(n)=x_1(n)-x_2(n)s \quad (1)$$

$$x_{sum}(n)=x_1(n)+x_2(n) \quad (2)$$

Given that wind is represented more in lower-frequency ranges of audio signals than higher-frequency ranges, after computing the difference and the sum the techniques may apply a low-pass filter 402 to both the difference and the sum. For instance, the techniques may apply a low-pass filter with a cut-off frequency of 500 Hz to $x_{sum}(n)$ and $x_{diff}(n)$ in some instances. Further, these signals may be input to a decimation component 404 in some instances, which may decimate these audio signals from thirty-two samples per frame at sixteen kHz to thirty-two samples per frame at one kHz.

Thereafter, the filtered and decimated audio signals may be input to a power-estimation component 406, which may compute a power of these signals. For instance, the power-estimation component 406 may square the value of each of the sum and the difference signals for a frame, m, to generate their powers, $P_{sum}(m)$ and $P_{diff}(m)$, respectively.

After computing these powers for a given frame, the wind-detection component 128 may proceed to compute a likelihood that the frame represents meaningful wind and an approximation of a strength of the wind. To do so, both of $P_{sum}(m)$ and $P_{diff}(m)$ may be input to a ratio-calculation component 408, which may compute a ratio between the powers as follows:

$$R_{d/s}(m)=P_{diff}(m)/P_{sum}(m) \tag{3}$$

As described above, sound waves associated with wind may contact the first outer microphone 118(1) of the wireless earbud 104(1) differently than the second outer microphone 118(2). Thus, $P_{diff}(m)$ is generally large when significant wind is present and substantially equal to one when wind is not present. Thus, $R_{d/s}(m)$ is generally zero or near zero when no wind is present and closer to one when wind buffeting is present.

After computing the ratio, this value ($R_{d/s}(m)$) may be input to a wind-likelihood component 410, which may input the new R value into a continuous function for determining a current likelihood, L(m), that the wireless earbud is currently experiencing wind may be updated. In some instances, the wind-likelihood component 410 may implement the following algorithm for determining a likelihood of wind present in a given frame, m:

$$L(m)=\min(L(m-1)+\alpha_L(c_L R_{d/s}(m)-L(m-1),1) \tag{4}$$

where $\alpha_L$ is a smoothing time constant between zero and one and $c_L$ is an adjusting constant which may be approximately one. In some instances, a larger $\alpha_L$ is used in instances where a likelihood of wind for a current frame is increasing relative to a current L(m) (i.e., when the wind is attacking) and a smaller $\alpha_L$ is used in instances where a likelihood of wind for a current frame is decreasing relative to a current L(m). By doing so, the wind-likelihood component 410 may respond to wind quickly and "hold" onto an existing wind for longer.

In addition, $P_{diff}(m)$ may be input to a wind-strength component 412, which may estimate a current strength of any potential wind represented in the given frame, m. Given that a larger wind may increase the difference in the first and second audio signals, the estimated wind strength may be based on $P_{diff}(m)$. In some instances, the wind-strength component 412 computes the estimated strength of the wind for the frame by using the $P_{diff}(m)$ to update a continuous function for an estimated power of any wind. For instance, the wind-strength component may utilize the following algorithm for computing a strength of wind for a given frame P(m):

$$P(m)=P(m-1)+\alpha_P(P_{diff}(m)-P(m-1)) \tag{5}$$

where $\alpha_P$ is a smoothing time constant between zero and one. Further, in some instances the wind-strength component 412 may apply a warping function that utilizes a shifting factor and a normalization factor such that the resulting indication of the strength of the wind for the given frame, S(m) highlights differences in wind speed between a predefined range of interest, such as 5 mph and 10 mph in some instances. Thus, a warping function may be applied as follows:

$$S(m) = 2/\left(1 + 2^{\left(u_p - \log\left(\frac{P(m)}{\sigma_p}\right)\right)}\right) \tag{6}$$

where $u_p$ is a shifting factor representing the center of the predefined range of interest for log(P(m)) and $\sigma_p$ is a normalization factor defining the span of the range of interest.

After calculating the current value of the likelihood of wind, L(m), and the current strength of the wind, S(m), the wind-detection component 128 may calculate a current level of wind for a frame, m, as follows:

$$\text{current level of wind}(m)=\min(L(m)S(m),1) \tag{7}$$

Thus, the wind-detection component 128 may calculate, for a given frame, m, a current level of wind between zero and one, where zero represents no wind and one represents significant wind (e.g., wind above the range of interest, such as above 10 mph). In some instances, the wind-detection component 128 may store these level-of-wind values between zero and one over time in order to make a determination regarding occurrence of a wind event, as well as occurrence of a clearance of a wind event. In other instances, the wind-detection component 128 outputs these wind-level values to the mode-modification component 130 or another component of the wireless earbud 104(1) for analyzing these value over time to make a determination regarding occurrence of a wind event as well as occurrence of a clearance of a wind event.

FIG. 5 illustrates example components of the example audio codec 310 of the wireless earbud 104(1). As illustrated, the audio codec 310 includes sub-components for modifying parameters (e.g., gain) associated with a mode executing on the wireless earbud 104(1), such as in response to detecting a wind event or determining that a wind event has cleared. As illustrated, this figure illustrates that each of the audio signals 320(1), 320(2), and 320(3) (potentially after being digitized via the ADCs 312) may be input a respective trim/gain component 502(1), 502(2), and 502(3). These trim/gain components may function to modify each respective audio signal based on slight differences in response between the respective microphones. Thus, the settings of these trim/gain components may set in-factory during a calibration process.

After the audio signals are slightly modified by the trim/gain components 502, the two outer audio signals may both be input to a mode-parameter component 504. This component 504 may function to acquire parameter values 512 associated with an active mode of the headphone 104(1) and implement these values. For instance, if a user or application has requested to activate the ANC mode, passthrough mode, sidetone mode, or the like, the mode-parameter component 504 may operate on the audio signals to execute this mode. Further, as illustrated the ALU 314 may include a feed-forward (FF) gain component 506 configured to apply a gain to the audio signals based on the current mode of the earbud 104(1), as well as a wind-gain component 508 configured to apply an additional gain to the audio signals in response to detecting occurrence of a wind event. For instance, the FF gain 506 may be used to apply a gain associated with an active mode (e.g., ANC, passthrough, sidetone, etc.), while the wind gain 508 may be used to attenuate this gain in response to detecting a wind event. That is, the wind gain 508 may attenuate, at a predefined rate, a gain of the audio signals in response to a wind event, while increasing, at a predefined rate, the gain of the audio signals back to their original levels in response to the wind event clearing.

After the outer audio signals have been modified (e.g., increased or decreased in gain) based on the active mode of the earbud 104(1) and/or detection of a wind event, these signals may be combined with the inner audio signal 320(3) and a playback signal 510. This summed signal may be further processed before eventually being output on a speaker 120 of the earbud 104(1). It is to be appreciated, however, that additional, non-illustrated audio processing may occur on each of these signals, including the playback signal 510 and the inner audio signal 320(3).

Figure 6:
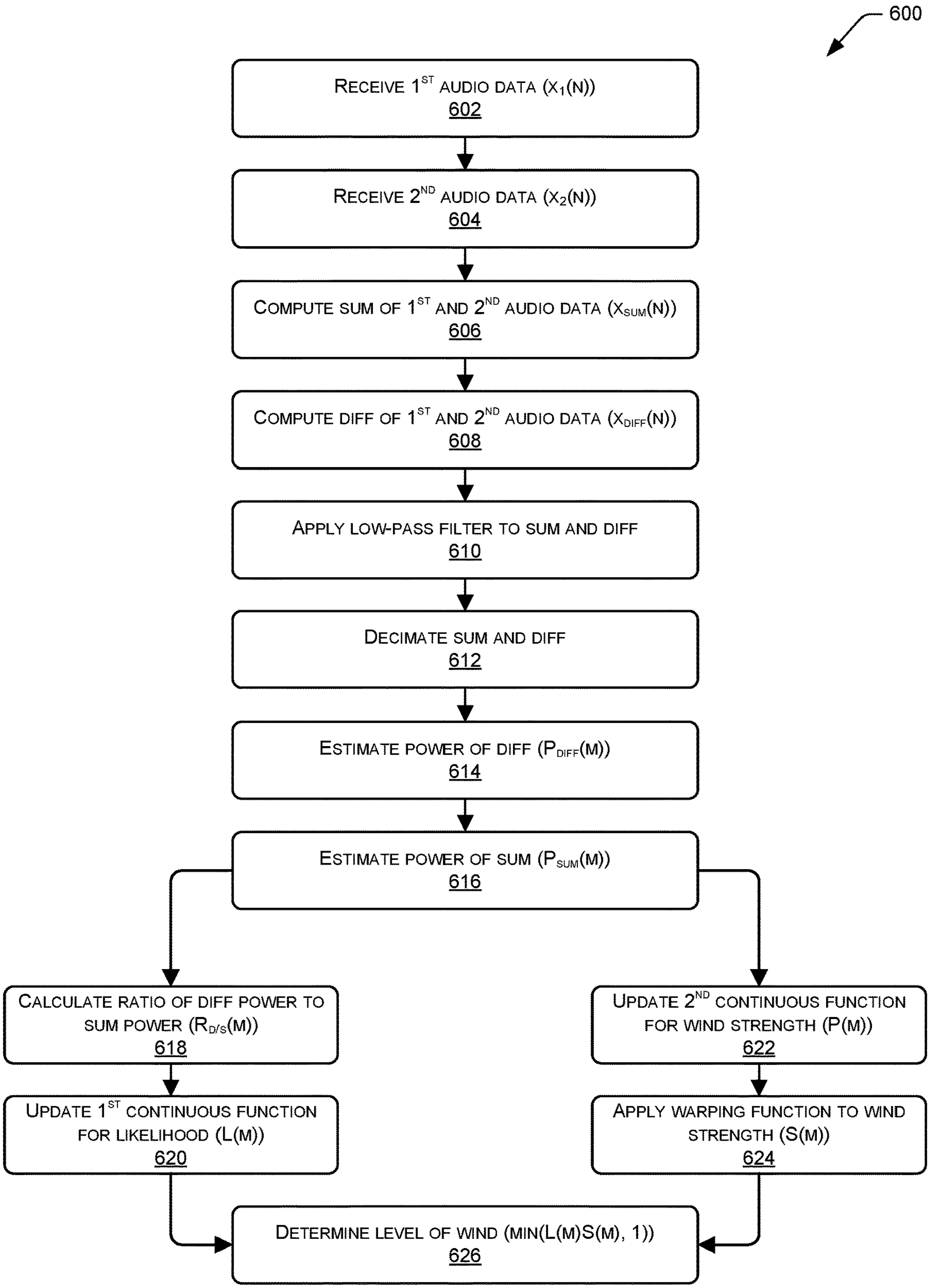
FIG. 6 illustrates a flow diagram of an example process for determining a level of wind, which in turn may be used to detect a wind event.

FIG. 6 illustrates a flow diagram of an example process 600 for determining a level of wind, which in turn may be used to detect a wind event. In some instances, the wind-detection component 128 may implement some or all of the process 600.

At an operation 602, the wind-detection component 128 may receive first audio data, such as first audio data generated by a first outer microphone 118(1) of a wireless earbud 104(1) or other electronic device. In some instances, the second audio data is generated and analyzed in the time domain. At an operation 604, the wind-detection component 128 may receive second audio data, such as second audio data generated by a second outer microphone 118(2) of a wireless earbud 104(1) or other electronic device. In some instances, the second audio data is generated and analyzed in the time domain.

At an operation 606, the wind-detection component 128 may compute a sum of the power of the first audio data and, at an operation 608, may compute a difference between the power of the first and second audio data. At an operation 610, the wind-detection component 128 may apply a low-pass filter to this sum and this difference and, at an operation 612, may decimate this filtered sum and difference.

At an operation 614, the wind-detection component 128 may estimate a power of the difference and, at an operation 616, may estimate a power of the sum of the audio data. At an operation 618, the wind-detection component 128 may calculate a ratio between the power of the difference and the power of the sum and, at an operation 620, may use this ratio for this frame to update a first continuous function that indicates a current likelihood that the wireless earbud or other electronic device is experiencing wind.

At an operation 622, the wind-detection component 128 may use the power of the difference between the audio signals to update a second continuous function that indicates a current estimated wind strength. At an operation 624, the wind-detection component 128 may input this estimated wind strength to a warping function, which may compute a current estimated strength of the wind. At an operation 626, the wind-detection component 128 may receive the current likelihood of wind, as well as the current estimated strength of wind, to compute a current wind-level value. In some instances, this wind-level value may comprise a minimum of one and a product of the current likelihood and the current estimated wind strength. This value may be stored and/or output for detecting a wind event. For instance, this wind-level value, and subsequent wind-level values, may be used to detect a wind event using the process described below with reference to FIG. 8 and to detect clearance of a wind event using the process described below with reference to FIG. 9.

Figure 7:
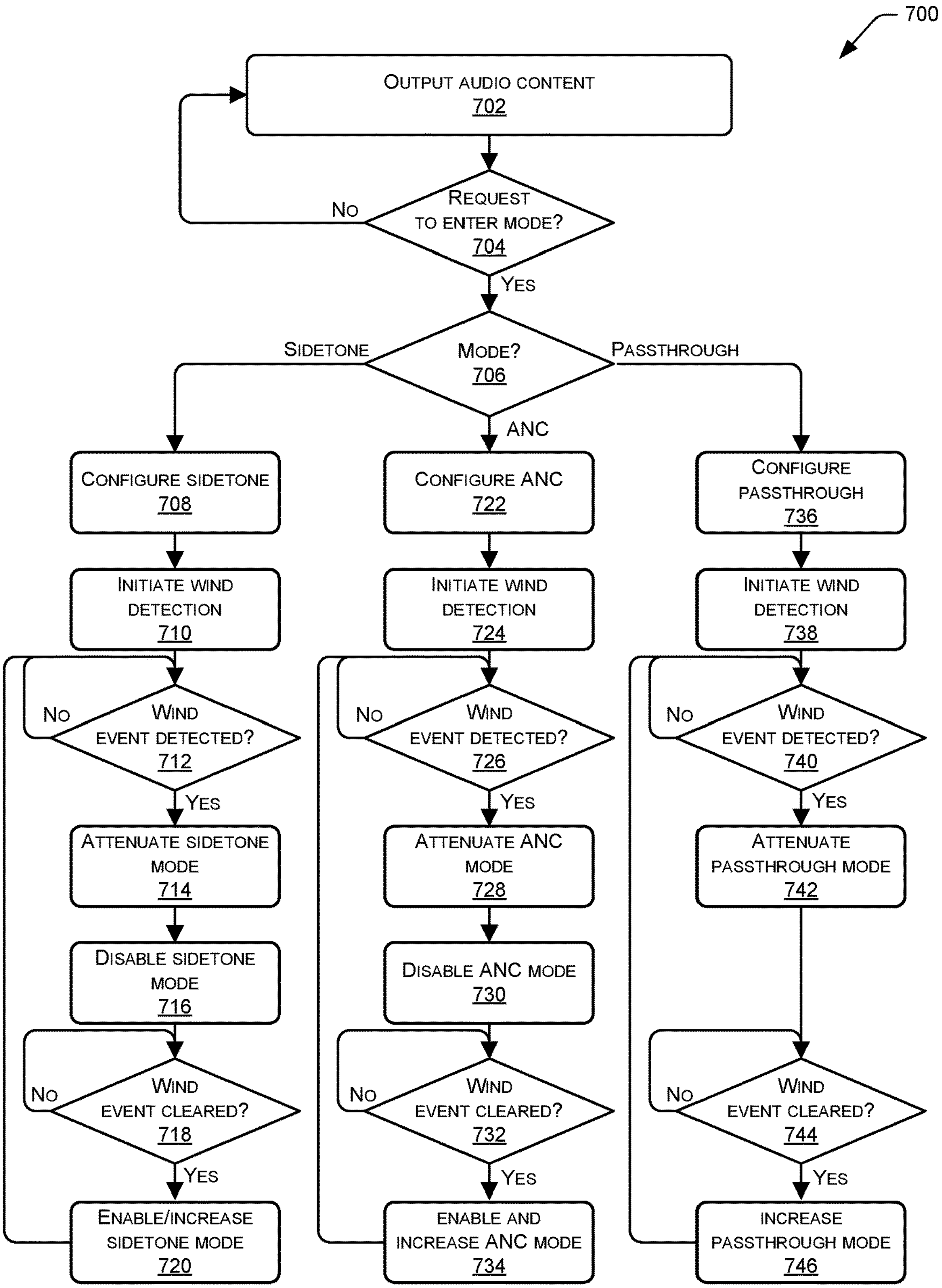
FIG. 7 illustrates a flow diagram of an example process for enabling one or more different modes on a wireless earbud, as well as modifying operation of the modes in response to detecting a wind event and re-modifying operation of the modes in response to determining that the wind event has cleared.

FIG. 7 illustrates a flow diagram of an example process 700 for enabling one or more different modes on a wireless earbud, as well as modifying operation of the modes in response to detecting a wind event and re-modifying operation of the modes in response to determining that the wind event has cleared. At an operation 702, an example wireless earbud 104(1) or other electronic device may output audio content using one or more speakers 120 of the earbud. At an operation 704, the wireless earbud 104(1) may determine whether it has received to enter a predefined mode, such as ANC mode, sidetone mode, passthrough mode, or the like. As described above, this request may be received from a user, from an application executing on the mobile device 106, or the like.

If no request is received, then the wireless earbud 104(1) continues to output the audio content at the operation 702. If, however, the wireless earbud 104(1) receives a request to enter a predefined mode, an operation 706 represents determining which mode is associated with the request, such as sidetone, ANC, and passthrough in this example. An operation 708 represents the wireless earbud 104(1) receiving a request to enter a sidetone mode and the wireless earbud 104(1) configuring the sidetone mode. This may comprise the wireless earbud 104(1) configuring parameters associated with the sidetone features so as to provide, in an audio signal output by the speaker 120, at least a portion of a user speech of the user of the wireless earbud 104(1).

An operation 710 represents the wireless earbud 104(1) initiating the wind-detection component 128 in response to entering the sidetone mode. In some instances, however, the wind-detection component 128 may have been previously operating prior to configuring the sidetone mode.

An operation 712 represents the wireless earbud 104(1) determining whether a wind event has been detected. As described above, this operation may comprise the wind-detection component 128 and/or the mode-modification component 130 determining occurrence of a wind event based on the wind-level values output by the wind-detection component 128. In some instances, the wind-detection component 128 and/or the mode-modification component 130 performs the process described below with reference to FIG. 8 to detect the wind event.

If the wireless earbud 104(1) does not detect the wind event, then the wireless earbud 104(1) continues to output the audio content according to the active mode. Upon a wind event being detected, however, the wireless earbud 104(1) may attenuate a gain of the sidetone mode at an operation 714. For instance, the wireless earbud 104(1) may attenuate the sidetone mode from 0 dB to −20 dB at a rate of 0.025 dB/ms. Of course, while one example is described, it is to be appreciated that other values may be used in other instances. After the sidetone mode has been attenuated (e.g., down to −20 dB or another target value), an operation 716 represents the wireless earbud disabling the sidetone mode (i.e., turning it off).

At an operation 718, the wireless earbud 104(1) determines whether the wind event has cleared. As described above, this operation may comprise the wind-detection component 128 and/or the mode-modification component 130 determining whether the wind event has cleared based on the wind-level values output by the wind-detection component 128. In some instances, the wind-detection component 128 and/or the mode-modification component 130 performs the process described below with reference to FIG. 9 to determine when the wind event has cleared. Further, and as discussed above, in some instances upon determining that the wind event has cleared, the wireless earbud 104(1) may check with the second wireless earbud 104(2) to ensure that it has cleared on that earbud before declaring the wind event cleared. Further, in some instances, clearing the wind event may include the wireless earbud 104(1) first receiving an indication of a clearance of the wind event from the wireless earbud 104(2) before ensuring, at the wireless earbud 104 (1), that the wind event has also cleared at the wireless earbud 104(1).

If the wind event has not cleared, then the wireless earbud 104(1) continues to output the audio content as modified based on the occurrence of the wind event. Upon determining that the wind event has cleared, however, the wireless earbud 104(1) may re-enable the sidetone mode and/or increase a gain of the sidetone mode at an operation 720. For instance, the wireless earbud 104(1) may increase the gain of the sidetone mode from −20 dB to 0 dB at a rate of 0.012 dB/ms. Of course, while one example is described, it is to be appreciated that other values may be used in other instances. Further, while this example describes the gain returning to the original, pre-wind-event value, in other instances the new target gain may be more or less than the original gain. For instance, the wireless earbud 104(1) may determine a gain based on the current wind-level values, with greater values resulting in a lesser sidetone gain and lesser values resulting in a higher sidetone gain. In either instance, after enabling the sidetone mode, the operation may return to outputting the audio content and monitoring for occurrence of a wind event at the operation 712.

Returning to the operation 706, the user or application may request to enter the ANC mode in some instances. An operation 722 represents the wireless earbud 104(1) configuring the wireless earbud 104(1) to output content according to the ANC in response to receiving this request. This may comprise the wireless earbud 104(1) configuring parameters associated with the ANC features so as to remove, from an audio signal output by the speaker 120, at least a portion of environmental noise from an ambient environment of the user of the wireless earbud 104(1).

At an operation 724, the wireless earbud 104(1) may initiate the wind-detection component 128 in response to entering the ANC mode. As described above, however, the wind-detection component 128 may have been enabled prior to the enabling of the ANC mode.

An operation 726 represents the wireless earbud 104(1) determining whether a wind event has been detected. As described above, this operation may comprise the wind-detection component 128 and/or the mode-modification component 130 determining occurrence of a wind event based on the wind-level values output by the wind-detection component 128. In some instances, the wind-detection component 128 and/or the mode-modification component 130 performs the process described below with reference to FIG. 8 to detect the wind event.

If the wireless earbud 104(1) does not detect the wind event, then the wireless earbud 104(1) continues to output the audio content according to the active mode. Upon a wind event being detected, however, the wireless earbud 104(1) may attenuate a gain of the ANC mode at an operation 728. For instance, the wireless earbud 104(1) may attenuate the ANC mode from 0 dB to −6 dB at a rate of 0.025 dB/ms. Of course, while one example is described, it is to be appreciated that other values may be used in other instances. After the ANC mode has been attenuated (e.g., down to −6 dB or another target value), an operation 730 represents the wireless earbud disabling the ANC mode (i.e., turning it off).

At an operation 732, the wireless earbud 104(1) determines whether the wind event has cleared. As described above, this operation may comprise the wind-detection component 128 and/or the mode-modification component 130 determining whether the wind event has cleared based on the wind-level values output by the wind-detection component 128. In some instances, the wind-detection component 128 and/or the mode-modification component 130 performs the process described below with reference to FIG. 9 to determine when the wind event has cleared. Further, and as discussed above, in some instances upon determining that the wind event has cleared, the wireless earbud 104(1) may check with the second wireless earbud 104(2) to ensure that it has cleared on that earbud before declaring the wind event cleared. Further, in some instances, clearing the wind event may include the wireless earbud 104(1) first receiving an indication of a clearance of the wind event from the wireless earbud 104(2) before ensuring, at the wireless earbud 104(1), that the wind event has also cleared at the wireless earbud 104(1).

If the wind event has not cleared, then the wireless earbud 104(1) continues to output the audio content as modified based on the occurrence of the wind event. Upon determining that the wind event has cleared, however, the wireless earbud 104(1) may re-enable the ANC mode and/or increase a gain of the ANC mode at an operation 734. For instance, the wireless earbud 104(1) may increase the gain of the ANC mode from −6 dB to 0 dB at a rate of 0.012 dB/ms. Of course, while one example is described, it is to be appreciated that other values may be used in other instances. Further, while this example describes the gain returning to the original, pre-wind-event value, in other instances the new target gain may be more or less than the original gain. For instance, the wireless earbud 104(1) may determine a gain based on the current wind-level values, with greater values resulting in a lesser ANC gain and lesser values resulting in a higher ANC gain. In either instance, after enabling the ANC mode, the operation may return to outputting the audio content and monitoring for occurrence of a wind event at the operation 726.

Returning to the operation 706, the user or application may request to enter the passthrough mode in some instances. An operation 736 represents the wireless earbud 104(1) configuring the wireless earbud 104(1) to output content according to the ANC in response to receiving this request. This may comprise the wireless earbud 104(1) configuring parameters associated with the passthrough features so as to add, to an audio signal output by the speaker 120, at least a portion of environmental noise from an ambient environment of the user of the wireless earbud 104(1). In some instances, the user may use the wireless earbud 104(1) or an application operating on the mobile device 106 to select a setting that defines a desired level (i.e., gain) of environmental noise to passthrough to the speaker in the ear canal of the user.

At an operation 738, the wireless earbud 104(1) may initiate the wind-detection component 128 in response to entering the passthrough mode. As described above, however, the wind-detection component 128 may have been enabled prior to the enabling of the passthrough mode.

An operation 740 represents the wireless earbud 104(1) determining whether a wind event has been detected. As described above, this operation may comprise the wind-detection component 128 and/or the mode-modification component 130 determining occurrence of a wind event based on the wind-level values output by the wind-detection component 128. In some instances, the wind-detection component 128 and/or the mode-modification component 130 performs the process described below with reference to FIG. 8 to detect the wind event.

If the wireless earbud 104(1) does not detect the wind event, then the wireless earbud 104(1) continues to output the audio content according to the active mode. Upon a wind event being detected, however, the wireless earbud 104(1) may attenuate a gain of the passthrough mode at an operation 742. For instance, the wireless earbud 104(1) may attenuate the passthrough mode from 0 dB to a target gain at a rate of 0.025 dB/ms, where the target gain may be defined on a current passthrough setting defined by a user of the wireless earbuds. The target gain may be, for instance, between −3 dB and −12 dB in some instances. Of course, while one example is described, it is to be appreciated that other values may be used in other instances. Further, while passthrough mode may be disabled after the attenuation of the gain in some instances, in other instances the wireless earbud 104(1) may continue to operate the passthrough mode (albeit at a lesser gain) during the wind event so that the user still receives some amount of the environmental noise in the output audio signal.

At an operation 744, the wireless earbud 104(1) determines whether the wind event has cleared. As described above, this operation may comprise the wind-detection component 128 and/or the mode-modification component 130 determining whether the wind event has cleared based on the wind-level values output by the wind-detection component 128. In some instances, the wind-detection component 128 and/or the mode-modification component 130 performs the process described below with reference to FIG. 9 to determine when the wind event has cleared. Further, and as discussed above, in some instances upon determining that the wind event has cleared, the wireless earbud 104(1) may check with the second wireless earbud 104(2) to ensure that it has cleared on that earbud before declaring the wind event cleared. Further, in some instances, clearing the wind event may include the wireless earbud 104(1) first receiving an indication of a clearance of the wind event from the wireless earbud 104(2) before ensuring, at the wireless earbud 104(1), that the wind event has also cleared at the wireless earbud 104(1).

If the wind event has not cleared, then the wireless earbud 104(1) continues to output the audio content as modified based on the occurrence of the wind event. Upon determining that the wind event has cleared, however, the wireless earbud 104(1) may increase a gain of the passthrough mode at an operation 746. For instance, the wireless earbud 104(1) may increase the gain of the passthrough mode back to 0 dB or another target gain at a rate of 0.012 dB/ms. Of course, while one example is described, it is to be appreciated that other values may be used in other instances. Further, while this example describes the gain returning to the original, pre-wind-event value, in other instances the new target gain may be more or less than the original gain. For instance, the wireless earbud 104(1) may determine a gain based on the current wind-level values, with greater values resulting in a lesser passthrough gain and lesser values resulting in a higher passthrough gain. In either instance, after increasing the gain of the passthrough mode, the operation may return to outputting the audio content and monitoring for occurrence of a wind event at the operation 740.

Figure 8:
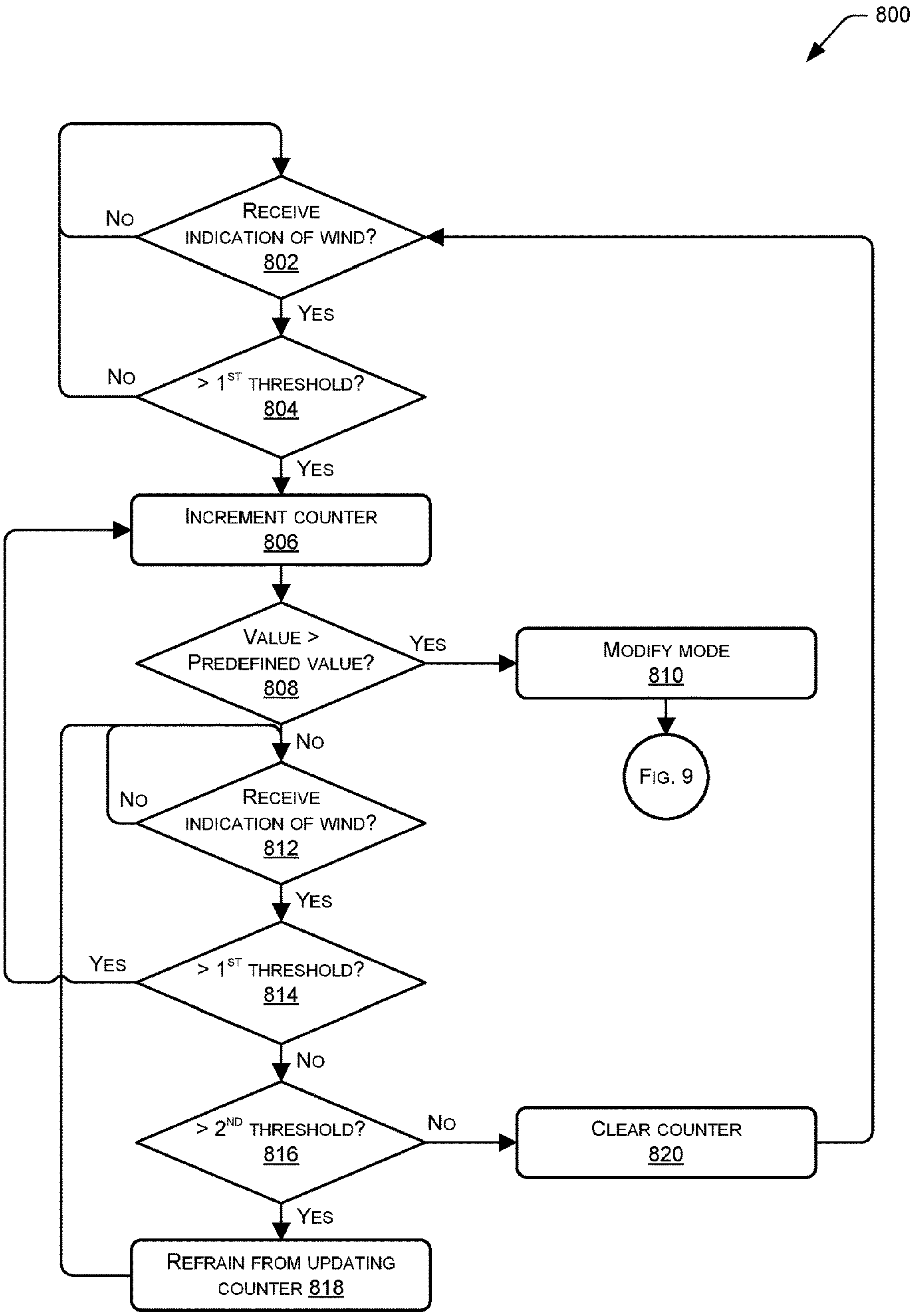
FIG. 8 illustrates a flow diagram of an example process for receiving indications of wind levels to detect a wind event and modify a mode of a wireless earbud or other headphone.

FIG. 8 illustrates a flow diagram of an example process 800 for receiving indications of wind levels to detect a wind event and modify a mode of a wireless earbud 104(1) or other headphone. As described above, the wind-detection component 128, the mode-modification component 130, and/or some other component may perform some or all of the process 800 in some instances. In some instances, this process may be implemented when a wind event has not been detected, that is when a wind event is not occurring and any modes operating on the wireless earbud or other device are operating without modification from the mode-modification component 130.

At an operation 802, the wireless earbud 104(1), or other electronic device, may receive an indication of wind, which may comprise a wind-level value for a given frame, as computed by the wind-detection component 128. For instance, this operation may comprise receiving, for a current frame or time, a value between zero and one from the wind-detection component 128, with this value being computed using the techniques described above with reference to FIG. 6.

At an operation 804, the wireless earbud 104(1) may determine whether this wind-level value is greater than a first threshold, such as 0.9 or some other value representative of a meaningful amount of wind. It is noted that while the examples described herein utilize normalized wind-level values (between zero and one), other implementations may utilize other values representative of lower and higher wind levels.

If the wind-level value is not greater than the first threshold, meaning that it is not indicative of meaningful or significant wind for that frame or time, then the process 800 returns to the operation 802. If, however, the wind-level value is greater than the first threshold, then at an operation 806, the wireless earbud 104(1) may increment a value of a counter (e.g., from zero to one). At an operation 808, the wireless earbud 104(1) may determine whether the current value of the counter (e.g., one) is greater than a predefined value. For instance, this predefined value may be based on which mode is currently active on the wireless earbud 104(1) or other electronic device. For instance, when in ANC mode, the wireless earbud 104(1) may utilize a predefined value of four, while utilizing a much higher value (e.g., 600) when operating in the sidetone and passthrough modes. It is to be appreciated, however, that these values are merely example and any other predefined values may be used.

If the wireless earbud 104(1) determines that the current value of the counter is greater than the predefined value, then at an operation 810 the wireless earbud 104(1) may modify the current mode of the earbud. For instance, the mode-modification component 130 may modify one or more parameters of the features of the current mode, which may result in attenuating the gain, disabling the feature, and/or the like. Further, the wireless earbud 104(1) or other electronic device may begin performing the process described below in FIG. 9 for determining when the wind event has cleared (and, thus, that the mode should be restored or otherwise re-modified).

If, however, the value of the counter is not greater than the predefined value, then at an operation 812 the wireless earbud 104(1) may determine whether it has received an additional indication of wind, such as a wind-level value for a subsequent frame or time. Upon receiving a subsequent wind-level value, at an operation 814 the wireless earbud 104(1) may determine whether this value is greater than the first threshold, such as 0.9. If so, then the process 800 returns to the operation 806 to increment the value of the counter (e.g., from one to two) and again proceeds to determine whether the current value is greater than predefined value at the operation 808.

If, however, the wind-level value is not greater than the first threshold, then at an operation 816 the wireless earbud 104(1) may determine whether this value is greater than a second threshold that is less than the first threshold, such as 0.7. In some instances, the second threshold may be selected to represent moderate, but not extreme or significant wind. If the wind-level value is greater than the second threshold, then at an operation 818 the wireless earbud 104(1) may refrain from altering the value of the counter and the process may return to the operation 812. If, however, the wind-level value is less than the second threshold, meaning that this wind-level value indicates that there is likely relatively little wind, then at an operation 820 the wireless earbud 104(1)

may clear the value of the counter (e.g., set the value back to zero) and the process may return to the operation 802.

Figure 9:
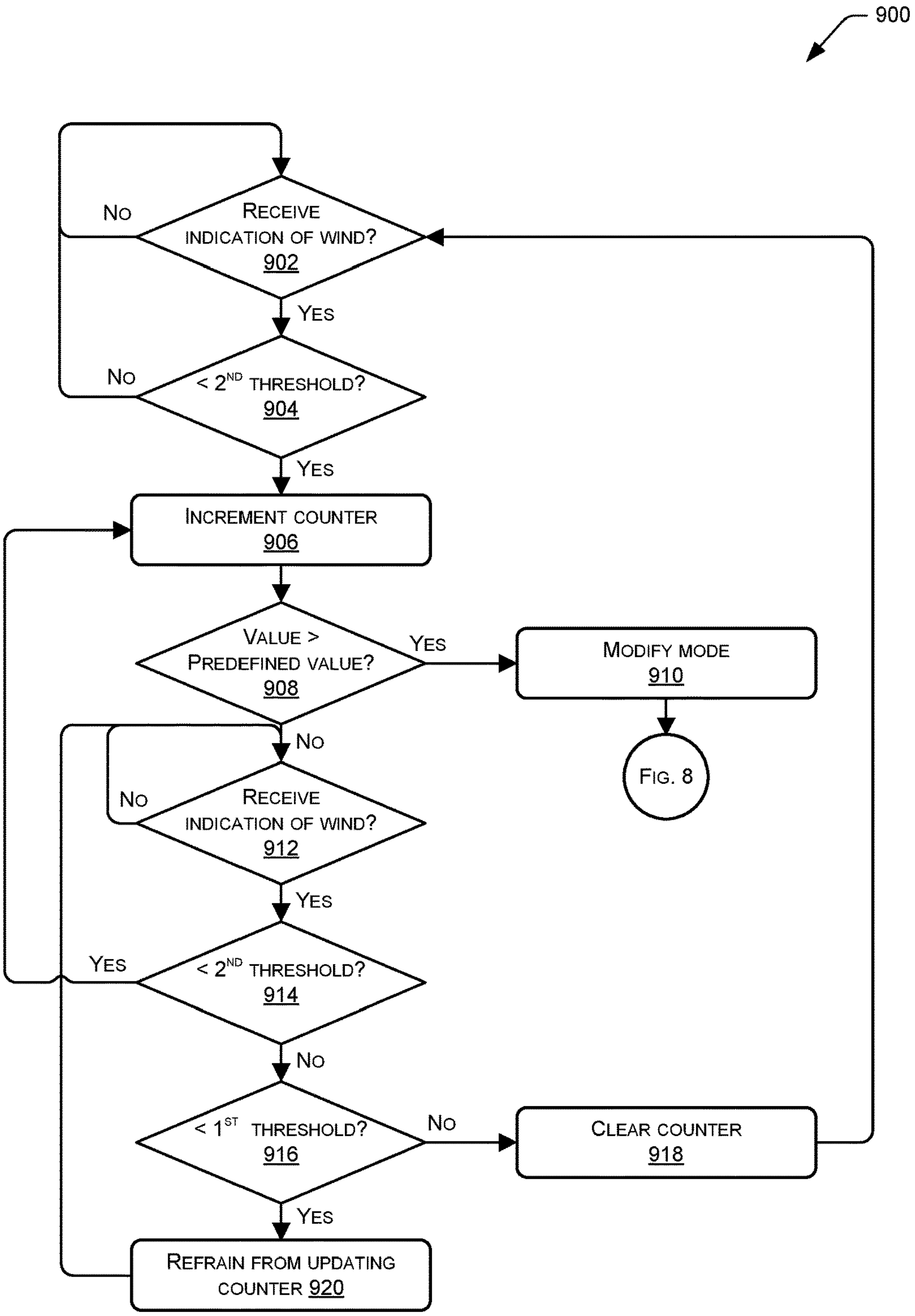
FIG. 9 illustrates a flow diagram of an example process for receiving indications of wind levels to detect when a wind event has cleared and modify a mode of a wireless earbud or other headphone.

FIG. 9 illustrates a flow diagram of an example process 900 for receiving indications of wind levels to detect when a wind event has cleared and modify a mode of a wireless earbud 104(1) or other headphone. As described above, the wind-detection component 128, the mode-modification component 130, and/or some other component may perform some or all of the process 900 in some instances. In some instances, this process 900 may be implemented when a wind event has been detected, that is when a wind event is occurring and any modes operating on the wireless earbud or other device are operating with modification from the mode-modification component 130.

At an operation 902, the wireless earbud 104(1), or other electronic device, may receive an indication of wind, which may comprise a wind-level value for a given frame, as computed by the wind-detection component 128. For instance, this operation may comprise receiving, for a current frame or time, a value between zero and one from the wind-detection component 128, with this value being computed using the techniques described above with reference to FIG. 6.

At an operation 904, the wireless earbud 104(1) may determine whether this wind-level value is less than the first threshold, such as 0.7 or some other value representative of a meaningful amount of wind. It is noted that while the examples described herein utilize normalized wind-level values (between zero and one), other implementations may utilize other values representative of lower and higher wind levels.

If the wind-level value is not less than the second threshold, meaning that it is indicative of at least some moderate wind for that frame or time, then the process 900 returns to the operation 902. If, however, the wind-level value is less than the second threshold, then at an operation 906, the wireless earbud 104(1) may increment a value of a counter (e.g., from zero to one). At an operation 908, the wireless earbud 104(1) may determine whether the current value of the counter (e.g., one) is greater than a predefined value. For instance, this predefined value may be based on which mode is currently active on the wireless earbud 104(1) or other electronic device. For instance, when in ANC mode, the wireless earbud 104(1) may utilize a predefined value of four for clearing a wind event, while utilizing a much higher value (e.g., thirty) when operating in the sidetone and passthrough modes. It is to be appreciated, however, that these values are merely example and any other predefined values may be used.

If the wireless earbud 104(1) determines that the current value of the counter is greater than the predefined value, then at an operation 910 the wireless earbud 104(1) may again modify the current mode of the earbud. For instance, the mode-modification component 130 may re-modify (e.g., restore) one or more parameters of the features of the current mode, which may result in enabling the feature, increasing the gain, and/or the like. Further, the wireless earbud 104(1) or other electronic device may begin performing the process described below in FIG. 8 for determining occurrence of another wind event.

If, however, the value of the counter is not greater than the predefined value, then at an operation 912 the wireless earbud 104(1) may determine whether it has received an additional indication of wind, such as a wind-level value for a subsequent frame or time. Upon receiving a subsequent wind-level value, at an operation 914 the wireless earbud 104(1) may determine whether this value is less than the second threshold, such as 0.7. If so, then the process 900 returns to the operation 906 to increment the value of the counter (e.g., from one to two) and again proceeds to determine whether the current value is greater than predefined value at the operation 908.

If, however, the wind-level value is not less than the second threshold, then at an operation 916 the wireless earbud 104(1) may determine whether this value is less than the first threshold (e.g., 0.9). If the wind-level value is less than the first threshold, then at an operation 918 the wireless earbud 104(1) may refrain from altering the value of the counter and the process may return to the operation 912. If, however, the wind-level value is not less than the first threshold, meaning that this wind-level value indicates that there is significant wind, then at an operation 920 the wireless earbud 104(1) may clear the value of the counter (e.g., set the value back to zero) and the process may return to the operation 902.

Figure 10:
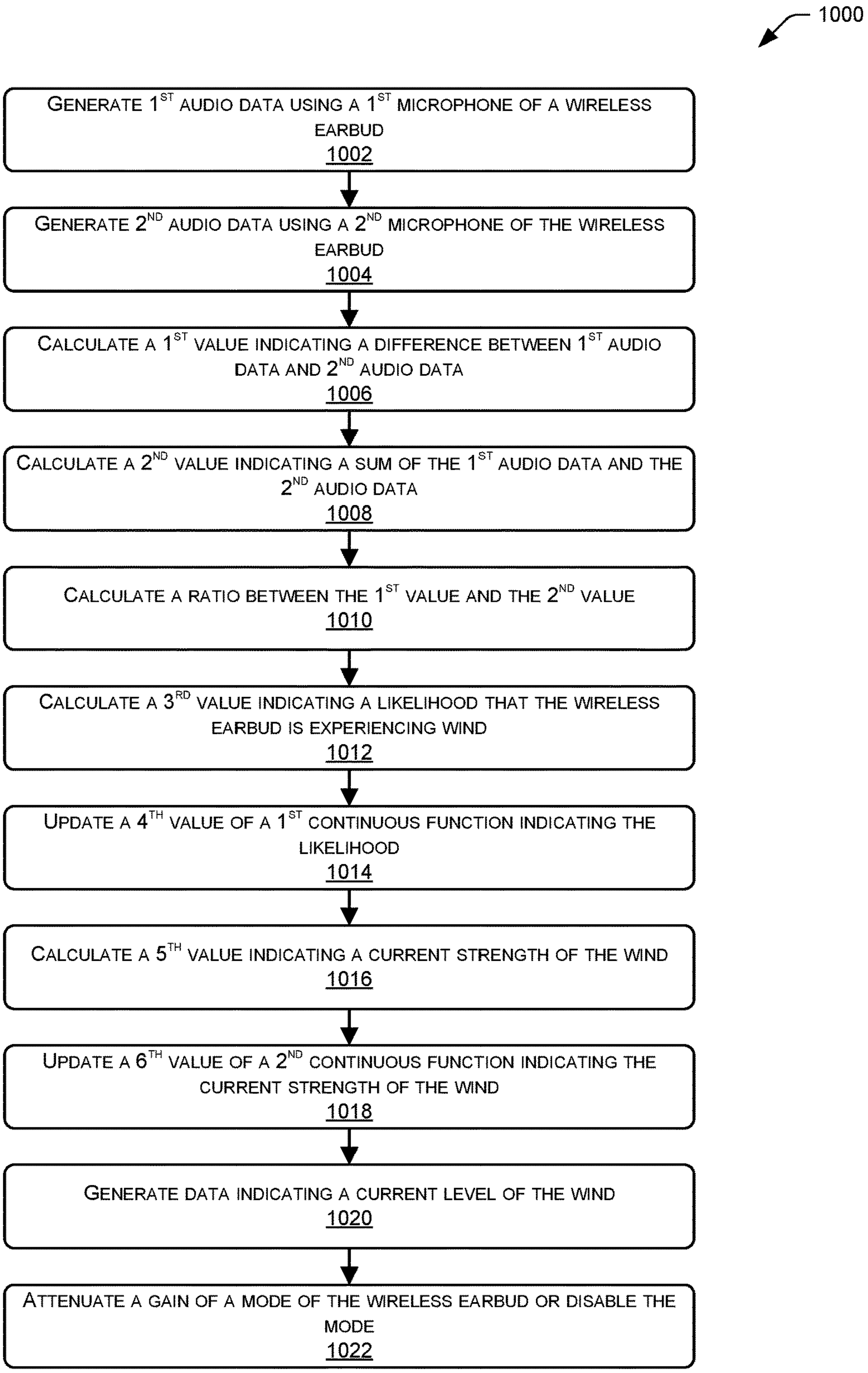
FIG. 10 illustrates a flow diagram of an example process for generating data indicating a current level of wind at a wireless earbud or other headphone.

FIG. 10 illustrates a flow diagram of an example process 1000 for generating data indicating a current level of wind at a wireless earbud or other headphone.

At an operation 1002, the wireless earbud 104(1) may generate first audio data using a first microphone of the wireless earbud. In some instances, the generating the first audio data comprises generating the first audio data using a first microphone configured to generate first sound from the ambient environment. Further, the generating the first audio data may comprise generating first audio data in a time domain using the first microphone.

At an operation 1004, the wireless earbud 104(1) may generate second audio data using a second microphone of the wireless earbud. In some instances, the generating the second audio data comprises generating the second audio data using a second microphone configured to generate second sound from the ambient environment. Further, the generating the second audio data may comprise generating second audio data in the time domain using the second microphone. At an operation 1006, the wireless earbud 104(1) may calculate a first value indicating a difference between: (i) a first frame of the first audio data corresponding to a first time, and (ii) a second frame of the second audio data corresponding to the first time. That is, this operation may comprise calculating a first value indicating the energy of the difference between the first frame of the first audio data and the second frame of the second audio data.

At an operation 1008, the wireless earbud 104(1) may calculate a second value indicating a sum of the first frame of the audio data and the second frame of the audio data. For instance, this operation may comprise calculating a second value indicating the energy of the sum of the first frame of the first audio data and the second frame of the second audio data. At an operation 1010, the wireless earbud 104(1) may calculate a ratio between the first value and the second value.

At an operation 1012, the wireless earbud 104(1) may calculate a third value indicating a likelihood that the wireless earbud is currently experiencing wind from an ambient environment of the wireless earbud. In some instances, the calculating the third value comprises calculating the third value using the first audio data in the time domain and the second audio data in the time domain.

At an operation 1014, the wireless earbud 104(1) may update a fourth value of a first continuous function using the first value, the fourth value indicating the likelihood that the wireless earbud is currently experiencing wind. At an operation 1016, the wireless earbud 104(1) may calculate a fifth value indicating a current strength of wind in the ambient environment. In some instances, the calculating the fifth value comprises calculating the fifth value using the first audio data in the time domain and the second audio data in the time domain. At an operation 1018, the wireless earbud 104(1) may update a sixth value of a second continuous function using the second value, the fourth value indicating the current strength of wind.

At an operation 1020, the wireless earbud 104(1) may generate data indicating a current level of wind in the ambient environment. In some instances, the generating the data indicating the current level of wind comprises generating the data indicating the current level of wind as a product of the fourth value and the sixth value. At an operation 1022, the wireless earbud 104(1) may at least one of attenuate a gain of a mode of the wireless earbud or disable the mode based at least in part on the data indicating the current level of wind.

Figure 11:
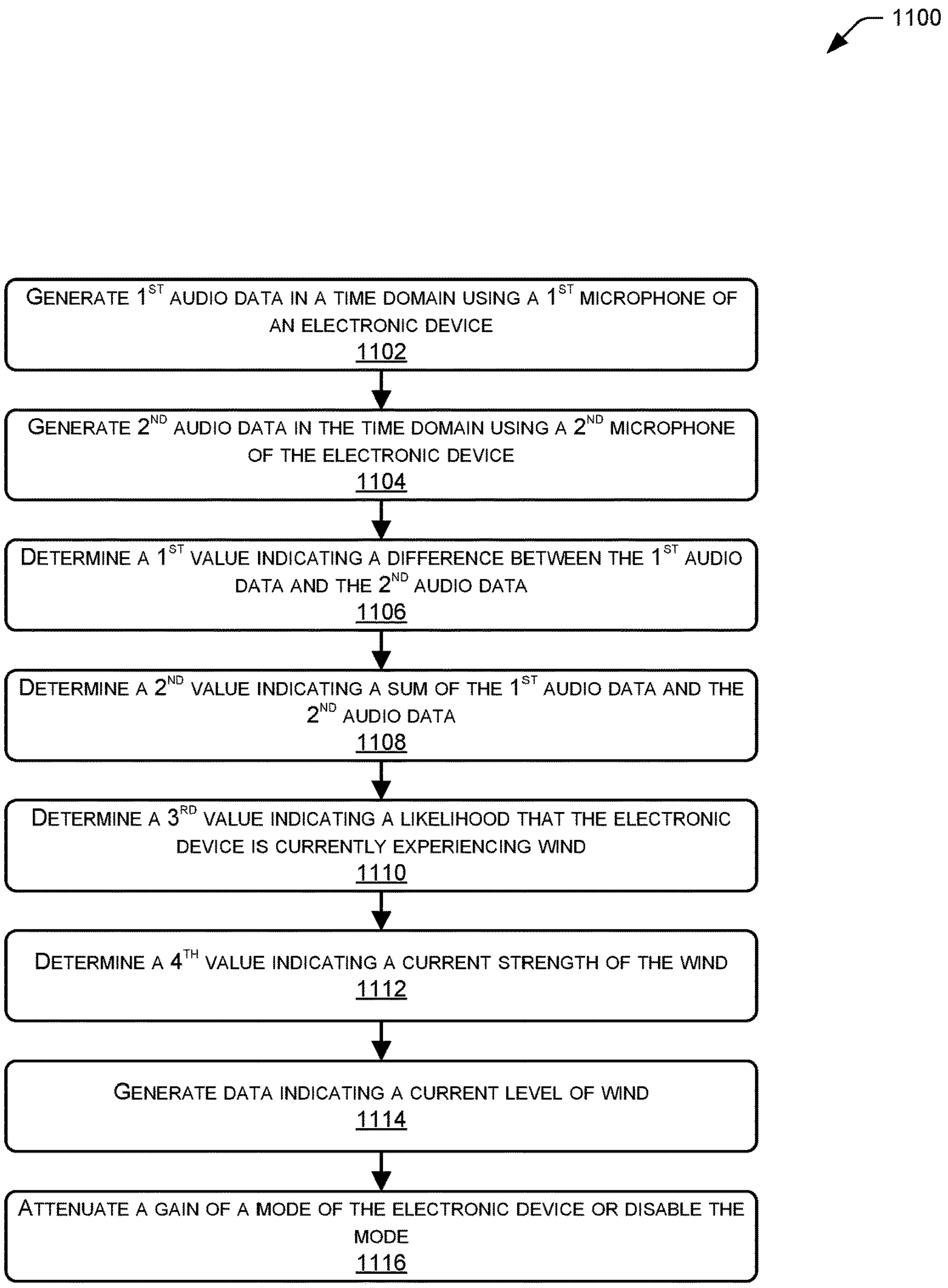
FIG. 11 illustrates a flow diagram of another example process for generating data indicating a current level of wind at a wireless earbud or other headphone.

FIG. 11 illustrates a flow diagram of another example process 1100 for generating data indicating a current level of wind at a wireless earbud or other headphone.

At an operation 1102, the wireless earbud 104(1) may generate first audio data in a time domain using a first microphone of the wireless earbud. At an operation 1104, the wireless earbud 104(1) may second audio data in the time domain using a second microphone of the wireless earbud. At an operation 1106, the wireless earbud 104(1) may determine a first value indicating a difference between at least a portion of the first audio data and at least a portion of the second audio data (e.g., the energy of a difference between the respective portions). At an operation 1108, the wireless earbud 104(1) may determine a second value indicating a sum of the portion of the first audio data and the portion of second audio data (e.g., the energy of a sum of the respective portions).

At an operation 1110, the wireless earbud 104(1) may determine, based at least in part on the first value and the second value, a third value indicating a likelihood that the wireless earbud is currently experiencing wind from an ambient environment of the wireless earbud. At an operation 1112, the wireless earbud 104(1) may determine, based at least in part on the second value, a fourth value indicating a current strength of wind in the ambient environment. At an operation 1114, the wireless earbud 104(1) may generate, based at least in part on the first value and the second value, data indicating a current level of wind in the ambient environment. In some instances, the generating comprises generating the data indicating the current level of wind as a product of the third value and the fourth value. At an operation 1116, the wireless earbud 104(1) may at least one of attenuate a gain of a mode of the wireless earbud or disable the mode based at least in part on the data indicating the current level of wind.

Figure 12:
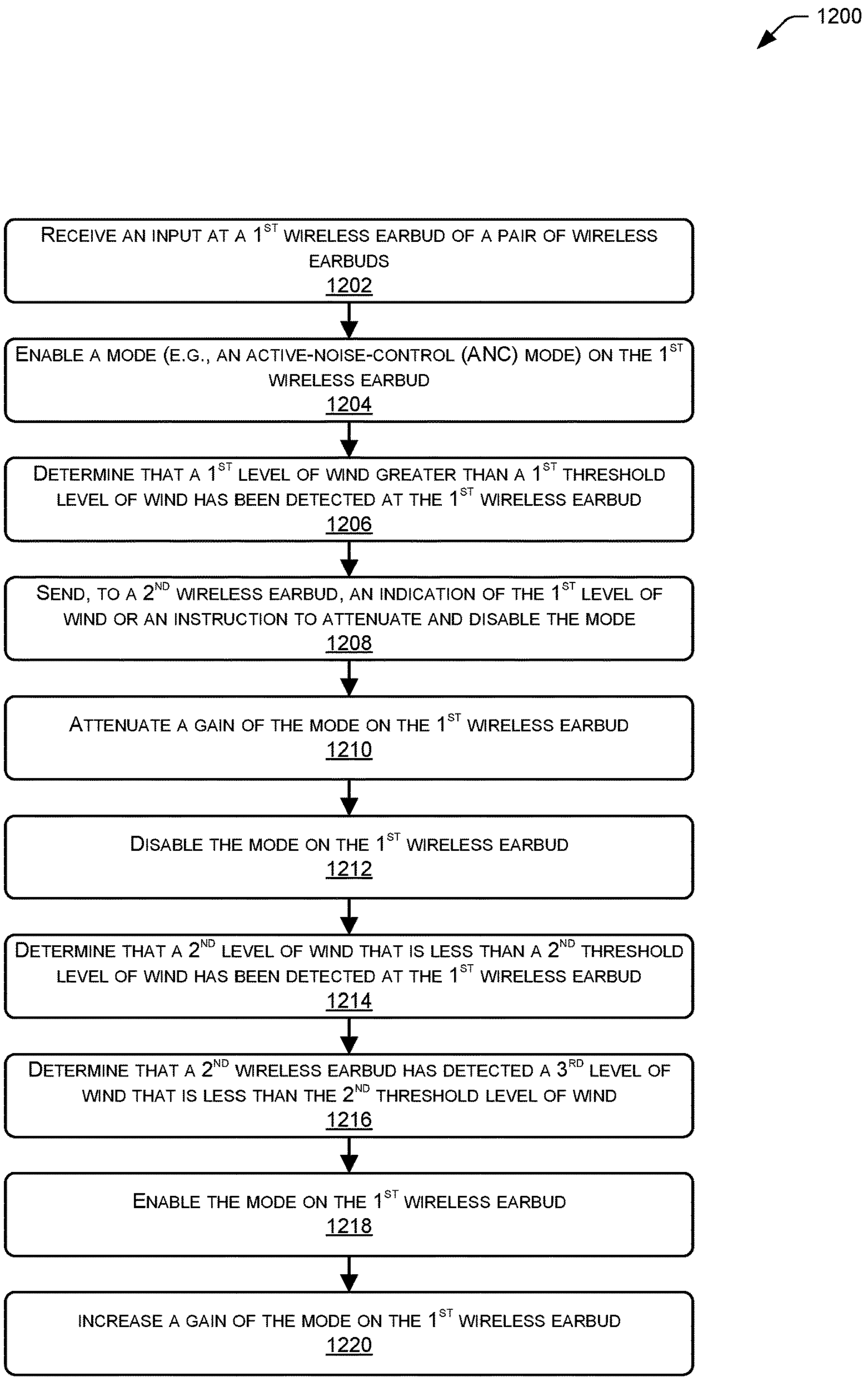
FIG. 12 illustrates a flow diagram of an example process modifying operation of a mode on a wireless earbud or other headphone based on detecting a threshold level of wind at the wireless earbud or other headphone.

FIG. 12 illustrates a flow diagram of an example process 1200 modifying operation of a mode on a wireless earbud or other headphone based on detecting a threshold level of wind at the wireless earbud or other headphone.

At an operation 1202, the wireless earbud 104(1) may receive an input at the wireless earbud. At an operation 1204, the wireless earbud 104(1) may enable an active-noise-control (ANC) mode on the wireless earbud at least partly in response to the receiving the input. At an operation 1206, the wireless earbud 104(1) may determine that a level of wind that is greater than a threshold level of wind has been detected at the wireless earbud. In some instances, the determining comprises determining that the level of wind that is greater than the threshold level of wind has been detected for at least one of a threshold number of frames of audio data or for a threshold amount of time.

At an operation 1208, the wireless earbud 104(1) may send, to a second wireless earbud of the pair of wireless earbuds, at least one of (i) an indication that the level of wind that is greater than the threshold level of wind has been detected at the first wireless earbud, or (ii) an instruction to disable the ANC mode on the second wireless earbud. At an operation 1210, the wireless earbud 104(1) may attenuate a gain of the ANC mode at a predefined rate prior to the disabling and at least partly in response to the determining that the threshold level of wind has been detected. At an operation 1212, the wireless earbud 104(1) may disable the ANC mode on the wireless earbud at least partly in response to the determining that the level of wind that is greater than the threshold level of wind has been detected.

At an operation 1214, the wireless earbud 104(1) may determine that a second level of wind that is less than a second threshold level of wind has been detected at the wireless earbud, wherein the second threshold level of wind is less than the first threshold level of wind. At an operation 1216, the wireless earbud 104(1) may determine that a second wireless earbud 104(2) has determined that a third level of wind is less than the second threshold. That is, the first wireless earbud 104(1) may receive an indication from the second wireless earbud 104(2) indicating that the second wireless earbud 104(2) has also determined that the wind event has cleared.

At an operation 1218, the wireless earbud 104(1) may re-enable the ANC mode on the wireless earbud at least partly in response to the determining that the second level of wind that is less than the second threshold level of wind has been detected and at least partly in response to determining that the second wireless earbud 104(2) has made a similar determination. At an operation 1220, the wireless earbud 104(1) may increase a gain of the ANC mode at a predefined rate.

Figure 13:
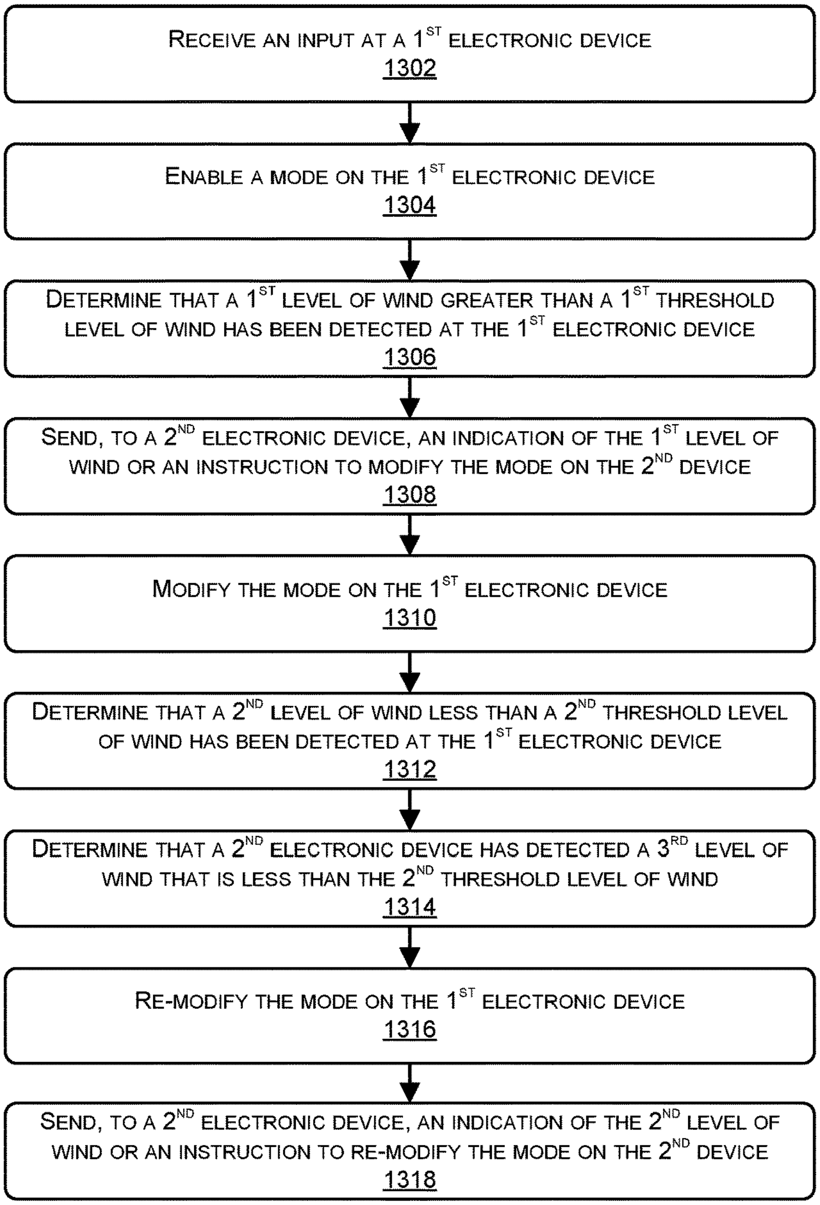
FIG. 13 illustrates a flow diagram of another example process modifying operation of a mode on a wireless earbud or other headphone based on detecting a threshold level of wind at the wireless earbud or other headphone.

FIG. 13 illustrates a flow diagram of another example process 1300 modifying operation of a mode on an electronic device, such as a wireless earbud or other headphone or any other electronic device having two closely-spaced microphones, based on detecting a threshold level of wind at the electronic device.

At an operation 1302, a first electronic device may receive an input at the first electronic device. At an operation 1304, the first electronic device may enable a mode on the first electronic device at least partly in response to the receiving the input. At an operation 1306, the first electronic device may determine that a first level of wind that is greater than a first threshold level of wind has been detected at the first electronic device.

At an operation 1308, the wireless earbud 104(1) may send, to a second electronic device, such as a second wireless earbud of the pair of wireless earbuds, at least one of: (i) an indication that the first level of wind that is greater than the first threshold level of wind has been detected at the first electronic device, or (ii) an instruction to modify the mode on the second electronic device. At an operation 1310, the first electronic device may modify the mode on the first electronic device at least partly in response to the determining that the first level of wind that is greater than the first threshold level of wind has been detected.

At an operation 1312, the first electronic device may determine that a second level of wind that is less than a second threshold level of wind has been detected at the first electronic device. At an operation 1314, the first electronic device may determine that a second electronic device, such as a second wireless earbud, has determined that a third level of wind is less than the second threshold. That is, the first wireless earbud 104(1) may receive an indication from the second wireless earbud 104(2) indicating that the second wireless earbud 104(2) has also determined that the wind event has cleared. At an operation 1316, the first electronic device may re-modify the mode on the first electronic device at least partly in response to the determining that the second level of wind that is less than the second threshold level of wind has been detected. At an operation 1318, the first electronic device may send, to the second electronic device, at least one of: (i) an indication that the second level of wind that is less than the second threshold level of wind has been detected at the first electronic device, or (ii) an instruction to re-modify the mode on the second electronic device. In some instances, this operation is done in coordination with determining that the wind event has cleared and receiving, from the second electronic device, an indication that the second electronic device has also determined that the wind event has cleared.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) 116(1) and 116(2) may possess its own local memory, which also may store program modules, program data, and/or one or more operating systems. The processors(s) may be located in a single device or system, or across disparate devices or systems, which may be owned or operated by various entities.

The memory (computer-readable media) described herein, meanwhile, may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 116(1) and/or 116(2) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by a first wireless earbud of a pair of wireless earbuds, the method comprising:
- enabling an active-noise-control (ANC) feature on the first wireless earbud;
- generating first audio data using a first microphone of the first wireless earbud;
- generating second audio data using a second microphone of the first wireless earbud;
- determining, based on the first audio data and the second audio data, a first value indicating a likelihood that the first wireless earbud is experiencing wind and a second value indicating a current strength of the wind;
- determining, based at least in part on a product of the first value and the second value, a third value indicating a current level of the wind;
- determining, based at least in part on the third value, presence of a wind event;
- automatically disabling the ANC feature on the first wireless earbud at least partly in response to the wind event;
- determining, by the first wireless earbud, subsequent to the disabling, absence of the wind event;
- receiving an indication that a second wireless earbud of the pair of wireless earbuds has determined absence of the wind event; and
- re-enabling the ANC feature on the first wireless earbud based on absence of the wind event at the first wireless earbud and the second wireless earbud.

2. The method as recited in claim 1, further comprising, prior to the disabling, determining that the third value is higher than a threshold value for one of: (i) a threshold number of frames, or (ii) a first duration of time.

3. The method as recited in claim 1, wherein the determining the presence of the wind event comprises:
- determining that the third value is greater than a threshold value;
- incrementing a value of a counter; and
- determining that the value of the counter is greater than a predefined value.

4. The method as recited in claim 1, further comprising, prior to the disabling, reducing a gain associated with the ANC feature at a predefined rate.

5. The method as recited in claim 1, further comprising, prior to the re-enabling:
- generating third audio data using the first microphone of the first wireless earbud;
- generating fourth audio data using the second microphone of the first wireless earbud;
- calculating a fourth value based at least in part on the third audio data and the fourth audio data;
- determining that the fourth value is less than a threshold value;
- incrementing a value of a counter; and
- determining that the value of the counter is greater than a predefined value.

6. The method as recited in claim 1, further comprising sending, by the first wireless earbud to the second wireless earbud, at least one of: (i) an indication of presence of the wind event, or (ii) an instruction to disable the ANC feature on the second wireless earbud.

7. The method as recited in claim 1, further comprising:

generating third audio data using the first microphone of the first wireless earbud;

generating fourth audio data using the second microphone of the first wireless earbud; and wherein the determining the absence of the wind event comprises determining, based on the third audio data and the fourth audio data, absence of the wind event.

8. The method as recited in claim 1, wherein the automatically disabling comprises automatically disabling the ANC feature on the first wireless earbud without receiving an indication of a presence of the wind event from the second wireless earbud.

9. A first electronic device comprising:

a first microphone to generate first audio data;

a second microphone to generate second audio data;

one or more processors; and one or more computer-readable media storing computer-executable instructions that, when executed, cause the one or more processors to perform acts comprising:

enabling a feature on the first electronic device;

receiving the first audio data from the first microphone;

receiving the second audio data from the second microphone;

determining, based on the first audio data and the second audio data, a first value indicating a likelihood that the first electronic device is experiencing wind and a second value indicating a current strength of the wind;

determining, based at least in part on a product of the first value and the second value, a third value indicating a current level of the wind;

determining, based at least in part on the third value, presence of a wind event;

automatically modifying a state of the feature on the first electronic device at least partly in response to the wind event;

determining, subsequent to the modifying, absence of the wind event at the first electronic device;

receiving an indication that a second electronic device has determined absence of the wind event; and automatically re-modifying the state of the feature on the first electronic device based on absence of the wind event at the first electronic device and the second electronic device.

10. The first electronic device as recited in claim 9, wherein the one or more computer-readable media further store computer-executable instructions that, when executed, cause the one or more processors to perform an act comprising determining that the third value is higher than a threshold value for at least one of: (i) a threshold number of frames, or (ii) a first duration of time.

11. The first electronic device as recited in claim 9, wherein the determining the presence of the wind event comprises:

determining that the third value is greater than a threshold value;

incrementing a value of a counter; and determining that the value of the counter is greater than a predefined value.

12. The first electronic device as recited in claim 9, wherein the modifying comprises at least one of: (i) attenuating a gain associated with the feature, or (ii) disabling the feature.

13. The first electronic device as recited in claim 9, wherein the one or more computer-readable media further store computer-executable instructions that, when executed, cause the one or more processors to perform acts comprising, subsequent to the modifying:

receiving third audio data generated by the first microphone;

receiving fourth audio data generated by the second microphone;

calculating a fourth value based at least in part on the third audio data and the fourth audio data;

determining that the fourth value is less than a threshold value;

incrementing a value of a counter; and determining that the value of the counter is greater than a predefined value.

14. The first electronic device as recited in claim 9, wherein the one or more computer-readable media further store computer-executable instructions that, when executed, cause the one or more processors to perform acts comprising sending, by the first electronic device to the second electronic device, at least one of: (i) an indication of presence of the wind event, or (ii) an instruction to modify the feature on the second electronic device.

15. The first electronic device as recited in claim 9, wherein the automatically modifying comprises automatically modifying the state of the feature on the first electronic device without receiving an indication of a presence of the wind event from the second electronic device.

16. A method implemented at least in part by a first electronic device, the method comprising:

enabling a feature on the first electronic device;

determining, based at least in part on audio data generated using a microphone of the first electronic device, a first value indicating a likelihood that the first electronic device is experiencing wind and a second value indicating a current strength of the wind;

determining, based at least in part on a product of the first value and the second value, a third value indicating a current level of the wind;

determining, based at least in part on the third value, that a wind event has been detected at the first electronic device;

modifying a state of the feature on the first electronic device at least partly in response to the determining that the wind event has been detected;

determining, by the first electronic device, subsequent to the modifying, absence of the wind event at the first electronic device;

receiving an indication that a second electronic device has determined absence of the wind event; and re-modifying the state of the feature on the first electronic device based at least in part on the absence of the wind event at the first electronic device and the second electronic device.

17. The method as recited in claim 16, wherein the audio data is first audio data, and wherein the microphone is a first microphone, the method further comprising:

generating the first audio data using the first microphone;

generating second audio data using a second microphone of the first electronic device, wherein the first value and the second value are determined based at least in part on the first audio data and the second audio data; and determining that the third value is higher than a threshold for at least one of: (i) a threshold number of frames, or (ii) a first duration of time.

18. The method as recited in claim 17, further comprising:

incrementing a value of a counter at least partly in response to determining that the third value is higher than the threshold; and determining that the value of the counter is greater than a predefined value.

19. The method as recited in claim 16, wherein the modifying comprises at least one of: (i) attenuating a gain associated with the feature, or (ii) disabling the feature.

20. The method as recited in claim 16, wherein the modifying comprises modifying the state of the feature on the first electronic device without receiving an indication of a presence of the wind event from the second electronic device.

* * * * *